(12) United States Patent
Sugaya et al.

(10) Patent No.: US 11,206,110 B2
(45) Date of Patent: Dec. 21, 2021

(54) WIRELESS LAN COMMUNICATION DEVICE AND WIRELESS LAN COMMUNICATION METHOD

(71) Applicant: Sony Corporation, Tokyo (JP)

(72) Inventors: Shigeru Sugaya, Kanagawa (JP); Yusuke Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/632,392

(22) PCT Filed: May 16, 2018

(86) PCT No.: PCT/JP2018/018836
§ 371 (c)(1),
(2) Date: Jan. 20, 2020

(87) PCT Pub. No.: WO2019/021588
PCT Pub. Date: Jan. 31, 2019

(65) Prior Publication Data
US 2020/0153558 A1    May 14, 2020

(30) Foreign Application Priority Data
Jul. 27, 2017 (JP) .............. JP2017-145740

(51) Int. Cl.
*H04W 80/02* (2009.01)
*H04L 1/18* (2006.01)
(Continued)

(52) U.S. Cl.
CPC .......... *H04L 1/1819* (2013.01); *H04L 1/0047* (2013.01); *H04W 80/02* (2013.01); *H04W 84/12* (2013.01)

(58) Field of Classification Search
CPC .... H04L 1/1819; H04L 1/0047; H04W 80/02; H04W 84/12
See application file for complete search history.

(56) References Cited

U.S. PATENT DOCUMENTS

| 8,386,892 B1 | 2/2013 | Jamieson et al. |
| 2007/0153757 A1* | 7/2007 | Kim ............... H04W 28/06 370/338 |

(Continued)

FOREIGN PATENT DOCUMENTS

| JP | 2004-260633 A | 9/2004 |
| JP | 2010-050923 A | 3/2010 |

(Continued)

OTHER PUBLICATIONS

Extended European Search Report dated Jun. 26, 2020 in European Patent Application No. 18837408.6, 8 pages.

(Continued)

*Primary Examiner* — Fahmida S Chowdhury
(74) *Attorney, Agent, or Firm* — Xsensus, LLP

(57) ABSTRACT

[Problem to be Solved] It is possible to achieve more appropriate retransmission control in wireless LAN systems. [Solution] There is provided a wireless LAN communication device including: a generator that generates a data frame for which a data unit in which an encoding process is performed and a data unit in which a retransmission process is performed are different from each other; and a transmission section that transmits the data frame. The encoding process makes it possible to determine whether or not decoding is successful.

20 Claims, 34 Drawing Sheets

(51) Int. Cl.
*H04L 1/00* (2006.01)
*H04W 84/12* (2009.01)

(56) References Cited

U.S. PATENT DOCUMENTS

| | | | |
|---|---|---|---|
| 2009/0319852 A1* | 12/2009 | Nabetani | H04L 1/1854 |
| | | | 714/749 |
| 2012/0072520 A1 | 3/2012 | Radulescu et al. | |
| 2013/0315139 A1 | 11/2013 | Abraham et al. | |
| 2014/0079016 A1 | 3/2014 | Dai | |
| 2015/0295680 A1* | 10/2015 | Othman | H04L 5/0055 |
| | | | 370/329 |
| 2016/0365952 A1* | 12/2016 | Kim | H04L 1/1845 |
| 2016/0380727 A1 | 12/2016 | Ryu et al. | |
| 2017/0126363 A1 | 5/2017 | Wang et al. | |
| 2017/0230149 A1* | 8/2017 | Wang | H04L 1/1819 |
| 2017/0353887 A1* | 12/2017 | Kim | H04L 1/1614 |

FOREIGN PATENT DOCUMENTS

| | | |
|---|---|---|
| JP | 5254369 B2 | 8/2013 |
| JP | 2014-522610 A | 9/2014 |
| WO | 2015/006640 A1 | 1/2015 |
| WO | 2015/142932 A1 | 9/2015 |

OTHER PUBLICATIONS

International Search Report and Written Opinion dated Jul. 24, 2018 for PCT/JP2018/018836 filed on May 16, 2018, 11 pages including English Translation of the International Search Report.
Choi, S., et al., "IEEE 802.11 MAC-Level EEC scheme with retransmission combining," IEEE Transactions on Wireless Communications, vol. 5, No. 1, IEEE, Jan. 2006, pp. 203-211.
Lin, J., S., et al., "Novel Design and Analysis of Aggregated ARQ Protocols for IEEE 802.11n Networks," IEEE Transactions on Mobile Computing, vol. 12, No. 3, IEEE, Mar. 2013, pp. 556-570.

* cited by examiner

FIG. 7

| 1st MPDU Length:768 | | | 2nd MPDU Length:576 | | 3rd MPDU Length:864 | | | | 4th MPDU Length:528 | | Pad |
|---|---|---|---|---|---|---|---|---|---|---|---|
| 0–239 | 240–479 | 480–719 | 720–959 | 960–1199 | 1200–1439 | ~~1440–1679~~ | 1680–1919 | 1920–2159 | 2160–2399 | 2400–2639 | 2640–2879 |

| | | | Resend 3rd MPDU<br>Length:864 | | | 5th MPDU<br>Length:1152 | | | | 6th MPDU<br>Length:672 | | | Pad |
|---|---|---|---|---|---|---|---|---|---|---|---|---|---|
| 0-239 | 240-479 | 480-719 | | 960-1199 | 1200-1439 | 1440-1679 | ~~1680-1919~~ | | 1920-2159 | 2160-2399 | 2400-2639 | 2640-2879 | |
| | | | 720-863 | ~~~~ | 96-335 | 336-575 | 576-815 | 816-1055 | | | | | |

FIG. 19

| Preamble | Header | Aggregated MAC Layer Service Data Unit (A-MSDU) with FEC | Trailer |

| 0-255 | 256-511 | 512-767 | 768-1023 | 1024-1279 | 1280-1535 | 1536-1791 | 1792-2047 | 2048-2303 | 2304-2559 | 2560-2815 | 2816-3071 |

| 0-239 | 240-479 | 480-719 | 720-959 | 960-1199 | 1200-1439 | 1440-1679 | 1680-1919 | 1920-2159 | 2160-2399 | 2400-2639 | 2640-2879 | Pad |

| 1st MSDU | 2nd MSDU | 3rd MSDU | 4th MSDU | 5th MSDU | 6th MSDU |

WIRELESS LAN COMMUNICATION DEVICE AND WIRELESS LAN COMMUNICATION METHOD

CROSS-REFERENCE TO RELATED APPLICATIONS

The present application is based on PCT filing PCT/JP2018/018836, filed May 16, 2018, which claims priority to JP 2017-145740, filed Jul. 27, 2017, the entire contents of each are incorporated herein by reference.

TECHNICAL FIELD

The present disclosure relates to a wireless LAN communication device and a wireless LAN communication method.

BACKGROUND ART

In recent years, various retransmission schemes have been developed as communication techniques have been developed. For example, among wireless communication techniques, a technique related to retransmission control that is called Hybrid ARQ (Hybrid Automatic repeat-request, referred to below as "HARQ") has been developed.

For example, PTL 1 below discloses a technique to add HARQ to a wireless LAN protocol with MAC-based feedback.

CITATION LIST

Patent Literature

PTL 1: Japanese Patent No. 5254369

SUMMARY OF THE INVENTION

Problems to be Solved by the Invention

Here, it is requested to achieve more appropriate retransmission control in wireless LAN systems. More specifically, data (for example, MPDU (MAC layer Protocol Data Unit)) that is communicated in a wireless LAN system has a variable length, and therefore it is necessary to perform individual sequence management when fragment processing is performed for predetermined access control, making it difficult to perform control. It has therefore been difficult to directly apply the above-described HARQ to the wireless LAN system.

The present disclosure has been devised in view of the above-described circumstances, and provides a novel and improved wireless LAN communication device and wireless LAN communication method that make it possible to achieve more appropriate retransmission control in a wireless LAN system.

Means for Solving the Problems

According to the present disclosure, there is provided a wireless LAN communication device including: a generator that generates a data frame for which a data unit in which an encoding process is performed and a data unit in which a retransmission process is performed are different from each other; and a transmission section that transmits the data frame. The encoding process makes it possible to determine whether or not decoding is successful.

In addition, according to the present disclosure, there is provided a wireless LAN communication method that is executed by a computer. The wireless LAN communication method includes: generating a data frame for which a data unit in which an encoding process is performed and a data unit in which a retransmission process is performed are different from each other; and transmitting the data frame. The encoding process making it possible to determine whether or not decoding is successful.

In addition, according to the present disclosure, there is provided a wireless LAN communication device including: a reception section that receives a data frame for which a data unit in which an encoding process is performed and a data unit in which a retransmission process is performed are different from each other; and a reception process section that performs a reception process including decoding the data frame. The encoding process makes it possible to determine whether or not decoding is successful.

In addition, according to the present disclosure, there is provided a wireless LAN communication method that is executed by a computer. The wireless LAN communication method includes: receiving a data frame for which a data unit in which an encoding process is performed and a data unit in which a retransmission process is performed are different from each other; and performing a reception process including decoding the data frame. The encoding process makes it possible to determine whether or not decoding is successful.

Effects of the Invention

As described above, according to the present disclosure, it is possible to achieve more appropriate retransmission control in a wireless LAN system.

It should be noted that the above-described effects are not necessarily limitative. Any of the effects indicated in this description or other effects that may be understood from this description may be exerted in addition to the above-described effects or in place of the above-described effects.

BRIEF DESCRIPTION OF DRAWING

FIG. 7 is a diagram describing an example of a combining process using retransmitted MPDU.

FIG. 8 is a diagram describing an example of the combining process using the retransmitted MPDU.

FIG. 19 is a diagram describing an overview of a decoding process in the case where the present disclosure is applied to the A-MSDU.

MODES FOR CARRYING OUT THE INVENTION

Figure 1:
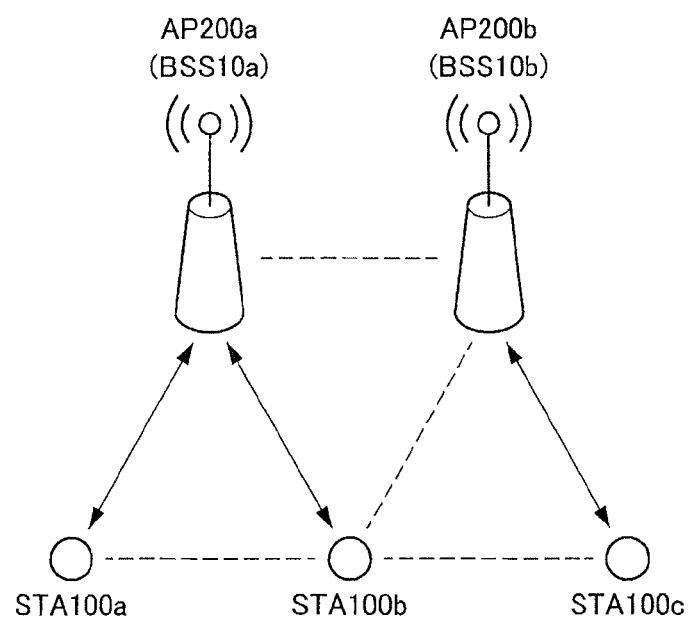
FIG. 1 is a diagram illustrating an example of a configuration of a wireless LAN system according to the present embodiment.

The following describes a preferred embodiment of the present disclosure in detail with reference to the accompanying drawings. It should be noted that, in this description and the accompanying drawings, components that have substantially the same functional configuration are indicated by the same reference signs, and thus redundant description thereof is omitted.

It should be noted that the description is given in the following order.

1. Background
2. Wireless LAN System according to Embodiment of Present Disclosure
3. Modification Examples
4. Application Examples
5. Conclusion

1. BACKGROUND

First, the background of the present disclosure is described.

As described above, in recent years, various retransmission schemes have been developed as communication techniques have been developed. For example, among wireless communication techniques, a technique related to retransmission control that is called HARQ has been developed. For example, in a public wireless communication system, an appropriate block length is defined depending on the number of subcarriers in a physical layer, and retransmission control is performed with this block length used as a unit. The block length used as a unit for retransmission control is then a fixed length, and the retransmission control or sequence management is thus easy.

Here, it is requested to achieve more appropriate retransmission control in wireless LAN systems. More specifically, data (for example, MPDU) that is communicated in a wireless LAN system has a variable length, and therefore fragment processing is difficult for predetermined access control, making it difficult to directly apply the above-described HARQ to the wireless LAN system. For example, in a case where HARQ is applied to a wireless LAN system, block partition positions in variable-length data that is communicated in the wireless LAN system are different from those of HARQ.

Furthermore, the retransmission control is performed in the wireless LAN system with MPDU used as a unit. Accordingly, even if HARQ is used for processing in a lower layer than the MAC layer, the retransmission control is not performed in a unit corresponding to HARQ. For example, if there is an error in one HARQ block, whole MPDU that is larger than the HARQ block is retransmitted, preventing improvement in efficiency of transmission path usage.

Furthermore, a frame aggregation technique is applied to the wireless LAN system to enable aggregation of a plurality of data units, and thus it is possible to reduce frame transmission overhead and improve transmission efficiency. Among frame aggregation techniques, a technique called A-MPDU (aggregated MPDU) aggregation has been considered particularly effective and generally and widely used. This technique aggregates a plurality of MPDUs as one physical layer frame.

In a case where HARQ is applied to an A-MPDU frame, block partition positions in each MPDU are different from those of HARQ, because the length of the MPDU is variable as described above. A receiver is therefore unable to perform a simple combining process of retransmitted MPDU and MPDU received in the past.

Furthermore, delimiter information including data length information of the MPDU in an A-MPDU configuration is appended at the beginning the of MPDU. The receiver that receives the A-MPDU recognizes boundaries of the respective MPDUs on the basis of the data length information. If the data length information included in the delimiter information is incorrect, the receiver is thus unable to correctly recognize boundaries of the respective MPDUs. Consequently, the receiver fails in a reception process of MPDU located at or after the boundary that has not been correctly recognized, and discards such MPDU.

The discloser of the present application has devised the present application in view of the circumstances described above. The present disclosure makes it possible to achieve more appropriate retransmission control in wireless LAN systems. The present disclosure also enables a reception process of MPDU to be successful even in a case where data length information of MPDU included in delimiter information in an A-MPDU configuration is incorrect. The following describes a wireless LAN system according to an embodiment of the present disclosure.

2. WIRELESS LAN SYSTEM ACCORDING TO EMBODIMENT OF PRESENT DISCLOSURE

The background of the present disclosure has been described above. Next, a wireless LAN system according to an embodiment of the present disclosure is described.

2-1. Configuration

First, the configuration of the wireless LAN system according to the present embodiment is described with reference to FIG. 1.

As illustrated in FIG. 1, the wireless LAN system according to the present embodiment includes access point devices (each referred to below as "AP (Access Point)") 200 and station devices (each referred to below as "STA (Station)") 100. One AP 200 and one or more STAs 100 then form a basic service set (referred to below as "BSS (Basic Service Set)") 10.

The wireless LAN system according to the present embodiment may be installed in any places. For example, the wireless LAN system according to the present embodiment may be installed in office buildings, residential houses, business or public establishments, and the like.

In addition, an area of the BSS 10 according to the present embodiment may overlap with an area of another BSS 10 (referred to below as "OBSS (Overlap Basic Service Set)") whose frequency channel overlaps with the frequency channel used by the BSS 10. In that case, a signal transmitted from the STA 100 located in the overlapping area may interfere with a signal transmitted from the OBSS. Referring to an example illustrated in FIG. 1, an area of BSS 10a overlaps with a portion of an area of BSS 10b that is OBSS, and STA 100b is located in the overlapping area. In this case, a signal transmitted from the STA 100b belonging to the BSS 10a may interfere with a signal transmitted from AP 200b or STA 100c belonging to the BSS 10b. It should be noted that FIG. 1 illustrates, as an example, a case where other wireless LAN systems cause interference therebetween, but this is not limitative. For example, a communication base station and a communication terminal in another communication system other than wireless LAN may overlap with the BSS 10a to cause interference.

Each of the APs 200 is a wireless LAN communication device that is coupled to an external network and provides the STA 100 with communication with the external network. For example, the AP 200 is coupled to the Internet and provides communication between the STA 100 and a device on the Internet or a device to be coupled via the Internet.

The STA 100 is a wireless LAN communication device that communicates with the AP 200. The STA 100 may be any communication device. For example, the STA 100 may be a display having a display function, a memory having a storage function, a keyboard and a mouse each having an input function, a speaker having a sound output function, or a smartphone having an advanced calculation processing execution function.

It should be noted that the functionality of the present disclosure may be achieved by either the AP 200 or the STA 100. That is, the AP 200 and the STA 100 may have the same functional components. Either or both of the AP 200 and the STA 100 may therefore be referred to below as "transmitter" or "receiver".

2-2. Overview of Functionality

The configuration of the wireless LAN system according to the present embodiment has been described above. Next, the overview of the functionality of the wireless LAN system according to the present embodiment is described.

In the wireless LAN system according to the present embodiment, a data frame is communicated in which a data unit in which an encoding process is performed and a data unit in which a retransmission process is performed are different from each other. The encoding process makes it possible to determine whether or not decoding is successful.

More specifically, the transmitter generates A-MPDU in which a plurality of MPDUs is aggregated, and appends an error correcting code to the A-MPDU in units of predetermined blocks. The receiver performs a reception process (including a decoding process) of the A-MPDU and specifies a block for which the reception process has been unsuccessful. Thereafter, the receiver performs a combining process of respective error-free blocks from MPDU for which the reception process has been unsuccessful and retransmitted MPDU to restore the MPDU, thereby succeeding in the reception process.

Furthermore, the transmitter may include, in a physical layer header (such as a PLCP header), information for use in identification of the aggregated MPDU in the A-MPDU or append a physical layer trailer (such as a PLCP trailer) including the same information to the end of a data frame. Here, the information for use in identification of MPDU, for example, means the data length, the sequence number, and the like of the MPDU. This enables the wireless LAN system to identify each MPDU even if the data length information included in the delimiter information is incorrect. Furthermore, including the information not only in the physical layer header, but also in the physical layer trailer enables the wireless LAN system to identify each MPDU included in the A-MPDU as long as the physical layer trailer is successfully received even if the physical layer header is unsuccessfully received.

Furthermore, the wireless LAN system is able to store a plurality of identical retransmission MPDUs in A-MPDU as long as a frame configuration of the A-MPDU has the capacity. This enables the wireless LAN system to increase the possibility of succeeding in the combining process.

It should be noted that it is merely an example that the data frame to be communicated is A-MPDU, but this is not limitative. For example, the data frame to be communicated may be A-MSDU, non-aggregated MPDU, or non-aggregated MSDU.

2-3. Details of Functionality

The overview of the functionality of the wireless LAN system according to the present embodiment has been described above. Next, the details (including a frame configuration and the like) of the functionality of the wireless LAN system according to the present embodiment are described. First, a physical layer header and a physical layer trailer of A-MPDU are described with reference to FIG. 2.

Figure 2:
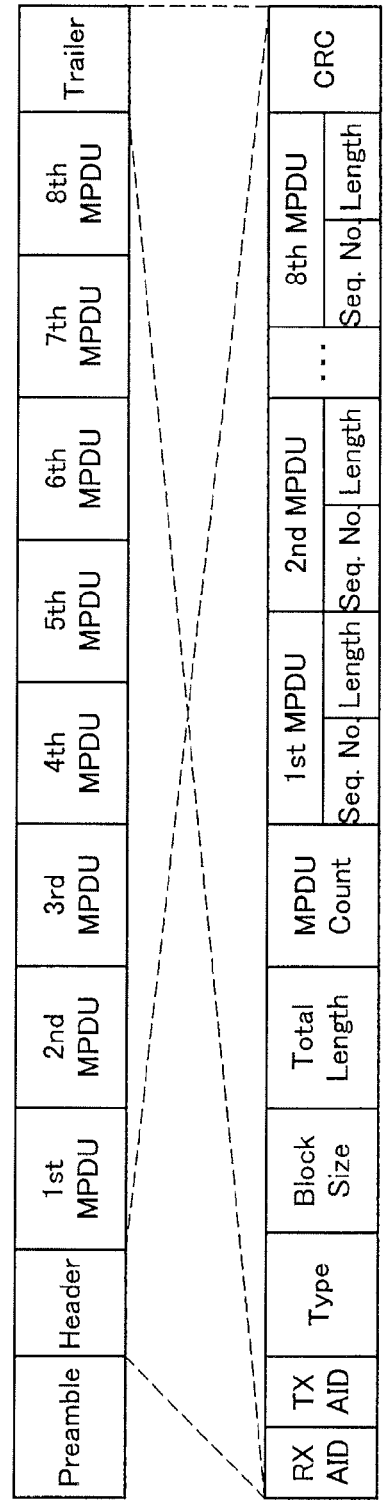
FIG. 2 is a diagram illustrating an example of a configuration of a physical layer header and a physical layer trailer.

As illustrated in FIG. 2, the transmitter generates a data frame in which the physical layer header is appended after a predetermined preamble (Preamble) or the physical layer trailer is appended after a plurality of aggregated MPDUs (eight MPDUs (1st MPDU to 8th MPDU) are aggregated in the diagram).

The physical layer header and the physical layer trailer include information such as recipient address identification information (RXAID), transmitter address identification information (TXAID), encoding format information (Type), encoding process block length information (Block Size), data length information (Total Length) of the entire A-MPDU, information (MPDU Count) of the number of MPDUs to be aggregated, sequence number information (Seq. No.) of the MPDUs and data length information (Length) of the MPDU as the information for use in identification of each MPDU, and an error detection code (CRC). It should be noted that FIG. 2 is merely an example, but the configuration of the physical layer header and the physical layer trailer of the A-MPDU is not limited thereto.

Figure 3:
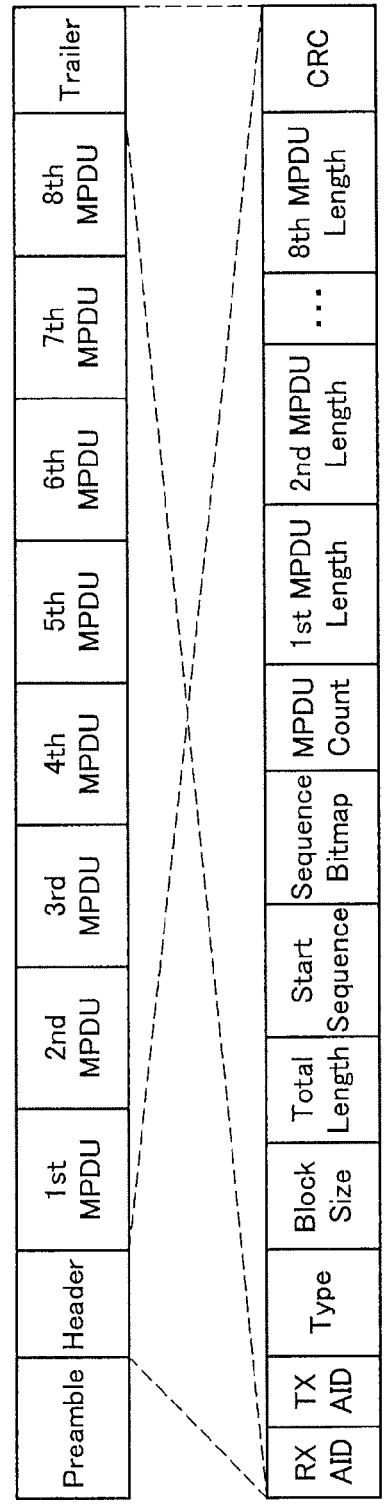
FIG. 3 is a diagram illustrating an example of the configuration of the physical layer header and the physical layer trailer.

Next, variations of a physical layer header and a physical layer trailer of A-MPDU are described with reference to FIG. 3. As illustrated in FIG. 3, the sequence number information (Seq. No.) of the MPDUs in FIG. 2 may be replaced with a starting sequence number (Start Sequence) and information (Sequence Bitmap) indicating the sequence number of the subsequent MPDU in a bitmap format. This eliminates the need to append the sequence number information (Seq. No.) of MPDU to each MPDU, and thus enables the transmitter to reduce the volume of A-MPDU information.

Figure 4:
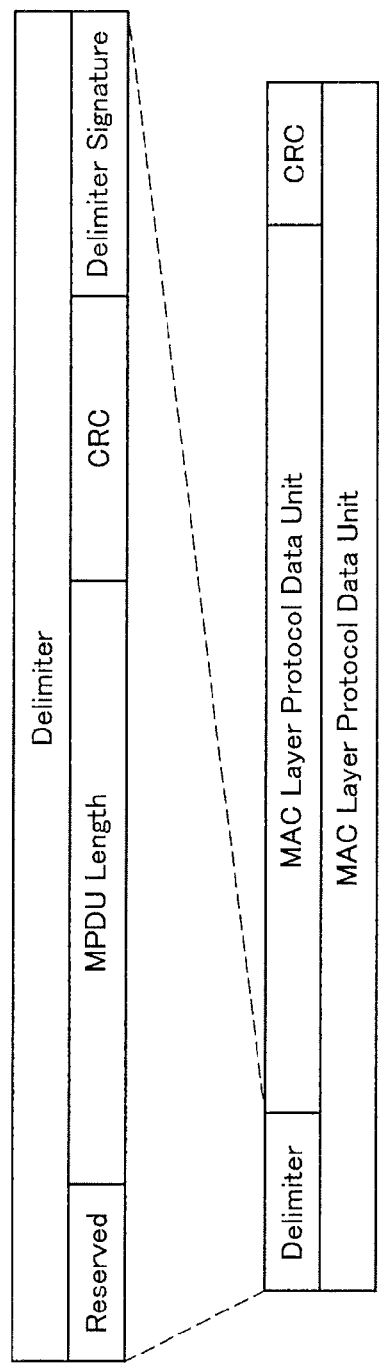
FIG. 4 is a diagram illustrating an example of a configuration of MPDU.

Next, the configuration of MPDU is described with reference to FIG. 4. As illustrated in FIG. 4, the MPDU includes delimiter information (Delimiter), protocol data unit (MAC Layer Protocol Data Unit) of a predetermined MAC layer, and an error detection code (CRC). The delimiter information then includes data length information (MPDU Length) of MPDU, an error detection code (CRC), delimiter identification information (Delimiter Signature) for use in identification of the delimiter information, and a reserved field (Reserved). It should be noted that FIG. 4 is merely an example, but the configuration of MPDU is not limited thereto.

Next, an overview of an encoding process is described with reference to FIG. 5.

Figure 5:
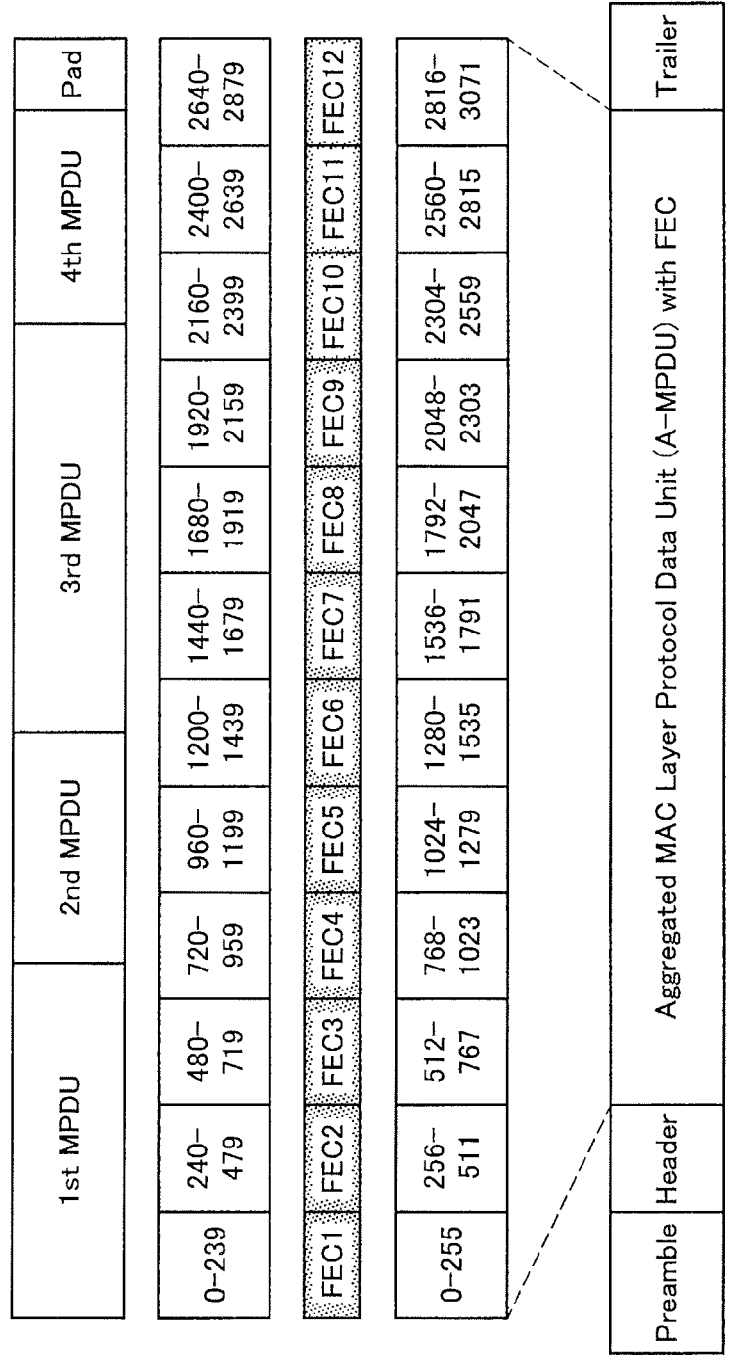
FIG. 5 is a diagram describing an overview of an encoding process.

In an example illustrated in FIG. 5, the transmitter targets, for the encoding process, data obtained by aggregating first MPDU (1st MPDU) to fourth MPDU (4th MPDU) and appending Padding (Pad) thereto as appropriate.

The transmitter then performs the encoding process using, for example, an RS (255, 239) code (code length: 255 symbols, data length: 239 symbols, parity length: 16 symbols), which is a kind of Reed-Solomon codes, as a process of a predetermined encoding unit. In this case, the transmitter partitions a data string configured as the A-MPDU on a 239-byte boundary, generates 16-byte redundancy codes (FEC 1 to FEC 12), and combines them to generate data having 255-byte blocks. Thus, 2880-byte data (0 to 2879) is changed to 3072-byte data (0 to 3071) as illustrated in FIG. 5.

The transmitter then generates a data frame obtained by appending the predetermined preamble (Preamble), the physical layer header (Header), and the physical layer trailer (Trailer) to the data generated as described above.

It should be noted that FIG. 5 is merely an example, but any encoding process may be employed as long as the encoding process makes it possible to determine whether or not decoding is successful.

Figure 6:
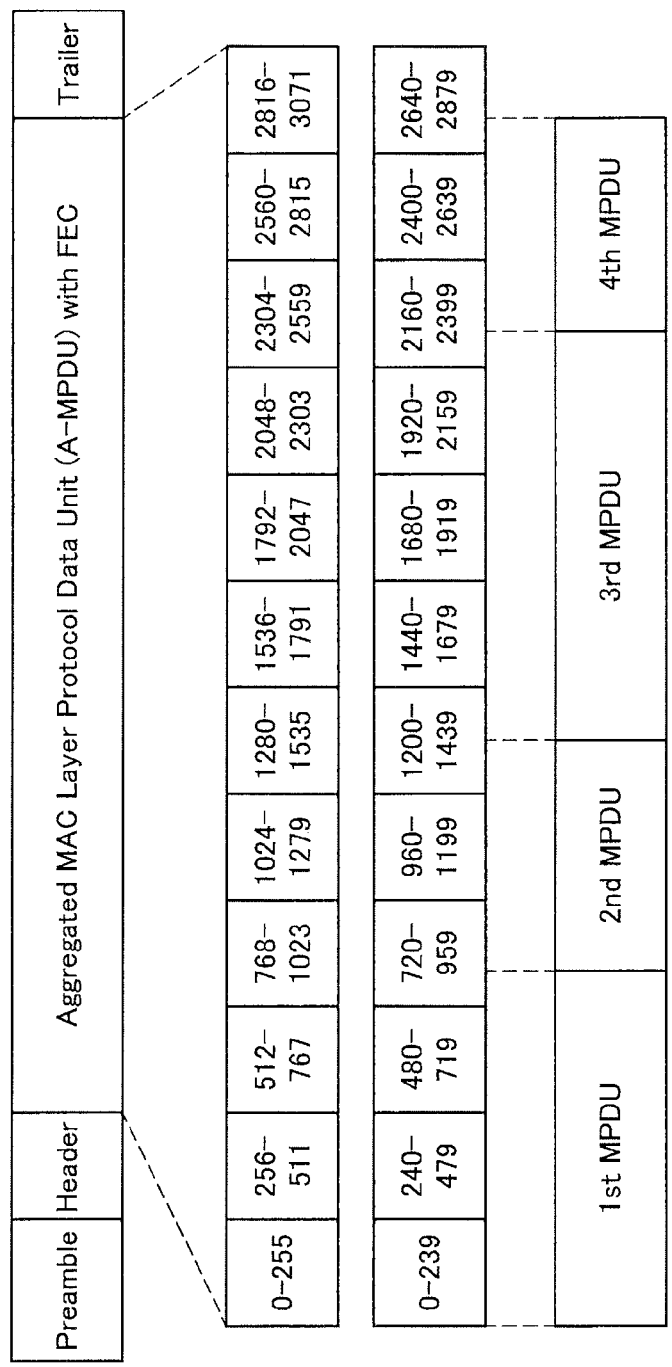
FIG. 6 is a diagram describing an overview of a decoding process.

Next, an overview of a decoding process is described with reference to FIG. 6.

The receiver detects the predetermined preamble (Preamble), recognizes that the received data frame is the data frame according to the present disclosure on the basis of the information included in the subsequent physical layer header (Header) or physical layer trailer (Trailer), and performs the decoding process according to the present disclosure.

First, the receiver acquires various parameters included in the physical layer header (Header) or the physical layer trailer (Trailer), and grasps the block length of the encoding process on the basis of the encoding format information (Type) or the like of the parameters. The receiver then performs error detection and error correction as a process of a predetermined encoding unit by extracting redundancy information from the encoded information. That is, the receiver performs the error detection and the error correction by extracting 0 to 239-byte information from 0 to 255-byte information. Thus, the receiver extracts the 2880-byte data (0 to 2879) from the 3072-byte data (0 to 3071) as illustrated in FIG. 6.

The receiver then stores a block for which an error has been detected and the error correction has been unsuccessful. More specifically, the receiver specifies MPDU for which the error correction has been unsuccessful and a range in the MPDU for which the error correction has been unsuccessful on the basis of the data length information (Length) of each MPDU and the sequence number information (Seq. No.) of each MPDU included in the physical layer header (Header) or the physical layer trailer (Trailer), and stores the information.

The receiver then requests the transmitter to retransmit the MPDU for which the error correction has been unsuccessful, and restores error-free MPDU by combining respective error-free blocks from the retransmitted MPDU and the MPDU transmitted in the past, thereby succeeding in the reception process.

Next, an example of the combining process of MPDUs is described with reference to FIGS. 7 to 11.

First, the receiver receives A-MPDU obtained by aggregating four MPDUs (1st MPDU to 4th MPDU) illustrated in FIG. 7 and performs the reception process including the decoding process on the A-MPDU.

It is then assumed that the receiver detects an error in a block in the third MPDU (3rd MPDU) and fails in the error correction. More specifically, it is assumed that the receiver fails in the error correction of a block ranging from the 1440th byte to the 1679th byte before the encoding process is performed on the A-MPDU (a block corresponding to a range from the 96th byte to the 335th byte in the third MPDU). It should be noted that the reception process for the MPDUs other than the third MPDU is successful.

The receiver notifies the transmitter of the successful reception process for the MPDUs other than the third MPDU by transmitting a predetermined response signal. It should be noted that the predetermined response signal may be, for example, block ACK (ACKnowledgement), but is not limited thereto.

The transmitter that receives the response signal grasps that the reception process of the MPDUs other than the third MPDU has been successful (in other words, the reception process for the third MPDU may have been unsuccessful) and retransmits the third MPDU.

For example, as illustrated in FIG. 8, the transmitter transmits, to the receiver, A-MPDU obtained by aggregating third MPDU (Resend 3rd MPDU) for retransmission, and the fifth MPDU (5th MPDU) and the sixth MPDU (6th MPDU) to be newly transmitted.

It is assumed that the receiver detects errors in a block including the end of the retransmitted third MPDU (Resend 3rd MPDU) and the beginning portion of the fifth MPDU (5th MPDU) and in a block included near the end of the fifth MPDU (5th MPDU), and fails in the error correction as illustrated in FIG. 8.

More specifically, it is assumed that the receiver fails in the error correction for a block ranging from the 720th byte to the 959th byte before the encoding process is performed on the A-MPDU (a block corresponding to a range from the 720th byte to the 863rd byte in the third MPDU and a block corresponding to a range from the 0th byte to the 95th byte of the fifth MPDU) and a block ranging from the 1680th byte to the 1919th byte (a block corresponding to a range from the 816th byte to the 1055th byte of the fifth MPDU).

Figure 9:
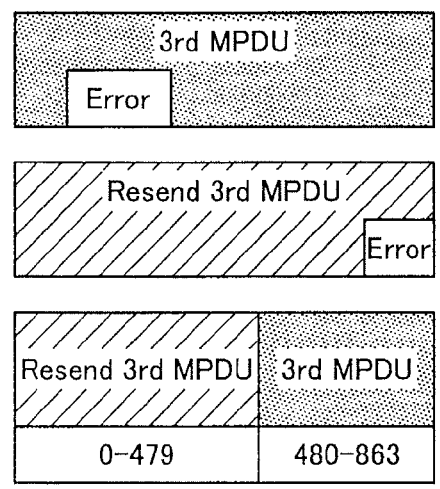
FIG. 9 is a diagram describing an example of the combining process using the retransmitted MPDU.

The receiver then performs the combining process using the third MPDU transmitted in the past and the retransmitted third MPDU. More specifically, the receiver combines respective error-free portions of the third MPDU (3rd MPDU) transmitted in the past and the retransmitted third MPDU (Resend 3rd MPDU). For example, as illustrated in FIG. 9, the receiver combines the 0th byte to the 479th byte of the retransmitted third MPDU (Resend 3rd MPDU) and the 480th byte to the 863rd byte of the third MPDU (3rd MPDU) transmitted in the past to restore error-free MPDU. It should be noted that any portions may be used for the combining process as long as the portions are error-free. For example, the 0th byte to the 719th byte of the retransmitted third MPDU (Resend 3rd MPDU) and the 720th byte to the 863rd byte of the third MPDU (Resend 3rd MPDU) transmitted in the past may be used for the combining process.

The receiver restores the third MPDU through the combining process and succeeds in the reception process. Accordingly, the receiver notifies the transmitter of that by transmitting a predetermined response signal.

The above-described combining process enables the wireless LAN system to achieve more appropriate retransmission control. More specifically, even if a block in MPDU includes an error, the receiver is able to use error-free portions of the MPDU for the combining process instead of discarding the whole MPDU. It is therefore possible to restore error-free MPDU with a higher probability. Furthermore, the receiver is able to perform the combining process without depending on the block length of the encoding process by managing an error-containing portion of the MPDU in units of bytes.

Although an example of the case where A-MPDU includes one MPDU for retransmission has been described above, A-MPDU may include a plurality of identical MPDUs for retransmission. For example, the transmitter may store a plurality of identical MPDUs for retransmission in A-MPDU as long as the frame configuration of the A-MPDU has the capacity.

Figure 10:
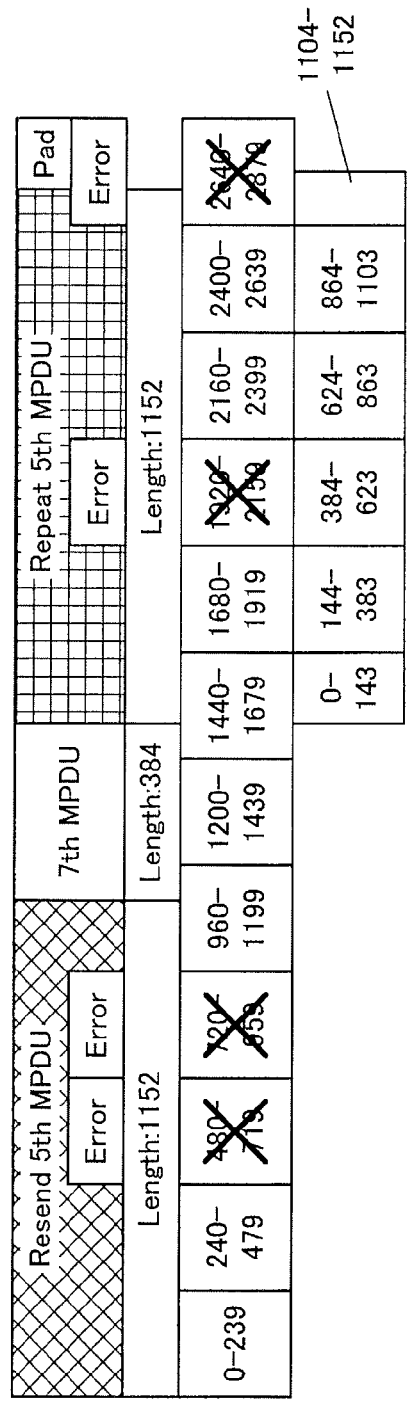
FIG. 10 is a diagram describing an example of a combining process using repeatedly retransmitted MPDU.

Now, a case where A-MPDU includes a plurality of identical MPDUs for retransmission is described with reference to FIG. 10. FIG. 10 illustrates another A-MPDU to be transmitted after the A-MPDU illustrated in FIG. 8.

The transmitter that receives a predetermined response signal from the receiver grasps that the reception process of the fifth MPDU may have been unsuccessful, and retransmits the fifth MPDU. The transmitter then stores a fifth MPDU (Resend 5th MPDU) for retransmission and the seventh MPDU (7th MPDU) to be newly transmitted as illustrated in FIG. 10. The transmitter then repeatedly stores the fifth MPDU (Repeat 5th MPDU) for retransmission in the A-MPDU if the A-MPDU has the capacity to have the fifth MPDU (Resend 5th MPDU) for retransmission repeatedly stored therein. It should be noted that FIG. 10 illustrates a case where two identical MPDUs for retransmission are stored, but any number of identical MPDUs for retransmission may be stored. The transmitter transmits the A-MPDU obtained by aggregating these MPDUs to the receiver.

It is assumed that the receiver detects errors in blocks included in the fifth MPDU (Resend 5th MPDU) for retransmission and the repeatedly retransmitted fifth MPDU (Repeat 5th MPDU), and fails in the error correction. More specifically, it is assumed the receiver fails in the error correction in a block ranging from the 480th byte to the 959th byte before the encoding process is performed on the A-MPDU, a block ranging from the 1920th byte to the 2159th byte before the encoding process is performed on the A-MPDU (a block corresponding to a range from the 384th byte to the 623rd byte in the repeatedly retransmitted fifth MPDU (Repeat 5th MPDU)), and a block ranging from the 2640th byte to the 2879th byte before the encoding process is performed on the A-MPDU (a block corresponding to a range from the 1104th byte to the 1152nd byte in the repeatedly retransmitted fifth MPDU (Repeat 5th MPDU)).

Figure 11:
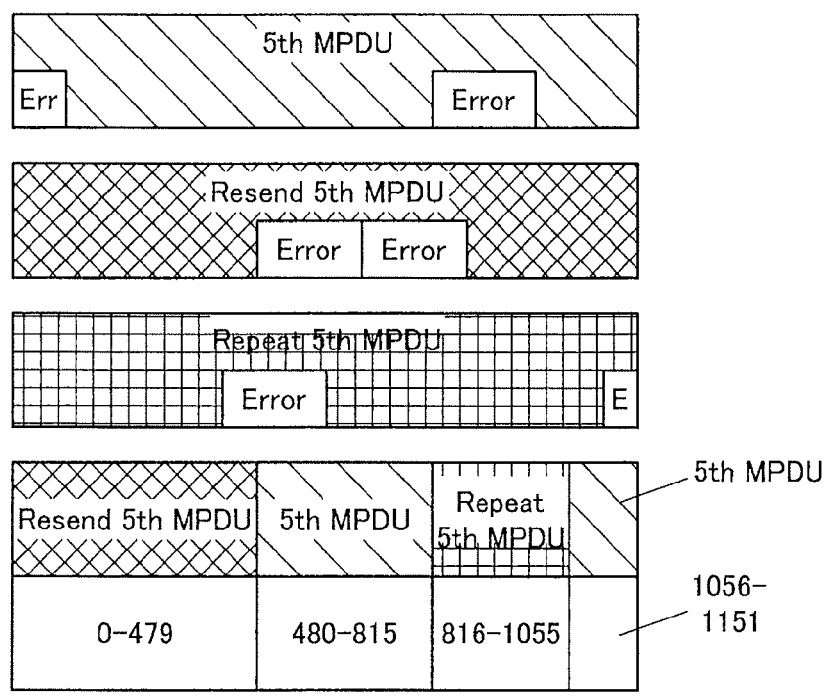
FIG. 11 is a diagram describing an example of the combining process using the repeatedly retransmitted MPDU.

The receiver then combines respective error-free portions of the fifth MPDU (5th MPDU) transmitted in the past, the fifth MPDU (Resend 5th MPDU) for retransmission, and the repeatedly retransmitted fifth MPDU (Repeat 5th MPDU). For example, as illustrated in FIG. 11, the receiver combines the 0th byte to the 479th byte of the fifth MPDU (Resend 5th MPDU) for retransmission, the 480th byte to the 815th byte and the 1056th byte to the 1151st byte of the fifth MPDU (5th MPDU) transmitted in the past, and the 816th byte to the 1055th byte of the repeatedly retransmitted fifth MPDU (Repeat 5th MPDU) to restore error-free MPDU. It should be noted that any portions may also be used for the combining process in this example as long as the portions are error-free.

The receiver restores the fifth MPDU through the combining process and succeeds in the reception process. Accordingly, the receiver notifies the transmitter of that by transmitting a predetermined response signal.

Repeatedly storing the MPDU for retransmission enables the wireless LAN system to increase the possibility of succeeding in the combining process and more effectively use the transmission path.

2-4. Functional Component

The details of the functionality of the wireless LAN system according to the present embodiment have been described above. Next, functional components of the AP 200 and the STA 100 are described with reference to FIG. 12.

It should be noted that the STA 100 and the AP 200 may include the same functional components as described above. The following therefore mainly describes functional components of the STA 100 and additionally describes functional components specific to the AP 200. Furthermore, the functional components described below are merely an example, but the functional components of the STA 100 and the AP 200 are not particularly limited. For example, functional components described below may be omitted as appropriate, or other functional components may be added.

Figure 12:
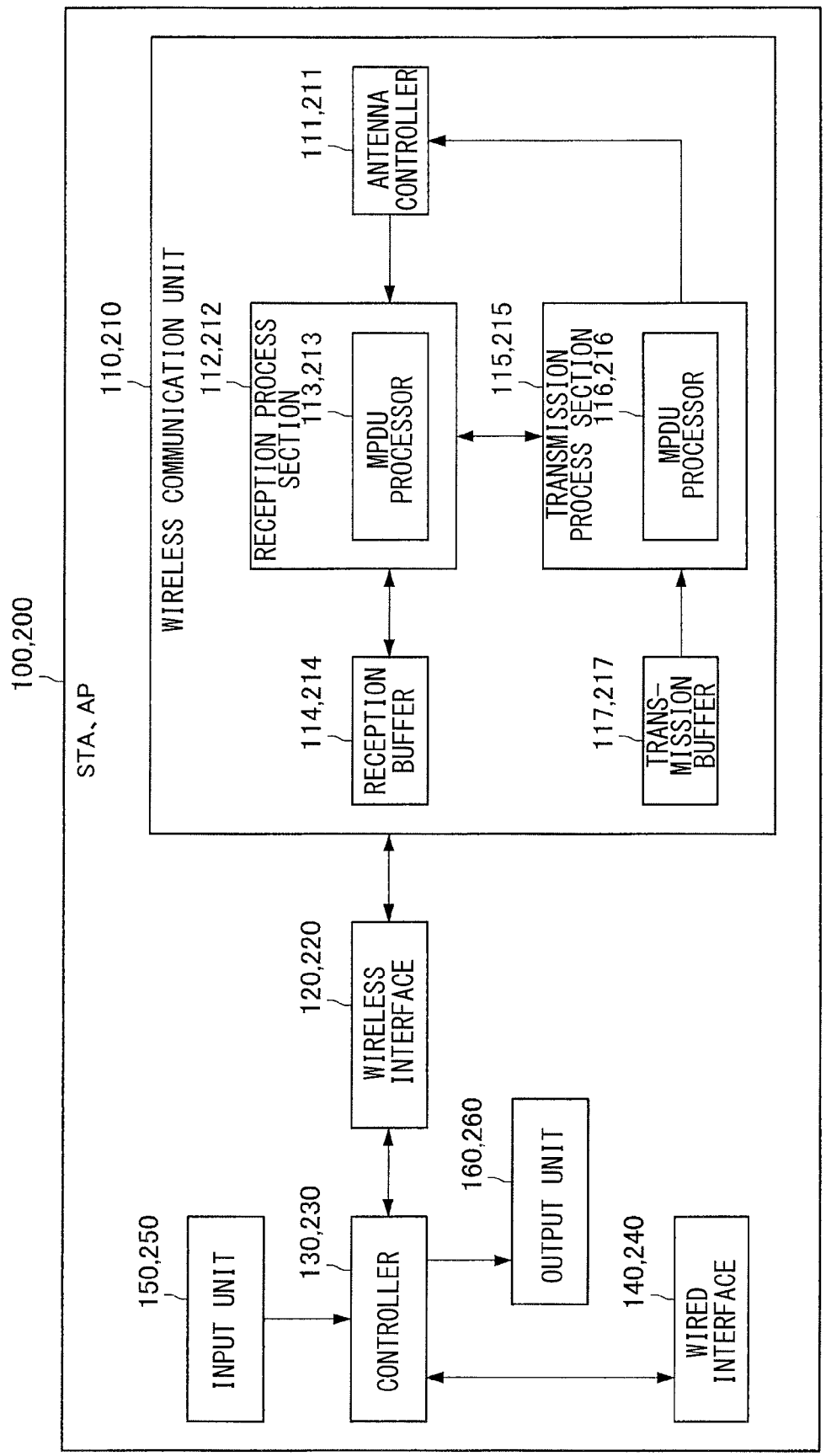
FIG. 12 is a block diagram illustrating an example of a functional component of AP and STA.

As illustrated in FIG. 12, the STA 100 includes a wireless communication unit 110, a wireless interface 120, a controller 130, a wired interface 140, an input unit 150, and an output unit 160.

(Wireless Communication Unit 110)

The wireless communication unit 110 has a functional component that performs all processes related to wireless communication. As illustrated in FIG. 12, the wireless communication unit 110 includes an antenna controller 111, a reception process section 112, an MPDU processor 113, a reception buffer 114, a transmission process section 115, an MPDU processor 116, and a transmission buffer 117.

(Antenna Controller 111)

The antenna controller 111 has a functional component that controls at least one antenna to transmit and receive wireless signals. For example, the antenna controller 111 functions as a reception section that receives a wireless signal transmitted from another communication device by controlling the antenna and provides the reception process section 112 with a signal obtained by performing a conversion process on the wireless signal to a reception level that allows extraction of a baseband signal in a subsequent process. Furthermore, the antenna controller 111 functions as a transmission section that transmits a transmission signal generated by the transmission process section 115 by controlling transmission power as necessary to more reliably cause the transmission signal to reach a destination device.

(Reception Process Section 112)

The reception process section 112 performs the reception process on a reception signal provided from the antenna controller 111. For example, the reception process section 112 outputs a baseband signal by performing analog processing and down-conversion on the reception signal obtained from the antenna. The reception process section 112 then extracts A-MPDU included in the baseband signal. The reception process section 112 then performs the decoding process in a block unit of the encoding process to perform the error detection and error correction process. The reception process section 112 provides the extracted A-MPDU or the like to the MPDU processor 113.

(MPDU Processor 113)

The MPDU processor 113 performs an MPDU-related process in the reception process. For example, the MPDU processor 113 separates each MPDU from the A-MPDU by using the sequence number information (Seq. No.) of the MPDUs and the data length information (Length) of the MPDUs acquired from the physical layer header or the physical layer trailer. It should be noted that the MPDU processor 113 may separate each MPDU from the A-MPDU by using the data length information (MPDU Length) of the MPDUs acquired from the delimiter information (Delimiter) of each MPDU.

Furthermore, the MPDU processor 113 performs a process on MPDU for which the error correction has been unsuccessful. More specifically, as the decoding process of a predetermined encoding unit, the MPDU processor 113 specifies MPDU for which the error correction has been unsuccessful and a range in the MPDU for which the error correction has been unsuccessful, and stores the information. The MPDU processor 113 then restores error-free MPDU by combining respective error-free portions of the MPDU and retransmitted MPDU (and repeatedly retransmitted MPDU) as the combining process. In a case where successfully restoring the error-free MPDU, the MPDU processor 113 then temporarily stores the MPDU in the reception buffer 114.

Furthermore, the MPDU processor 113 provides any application with the MPDU (or data included in the MPDU) for which the reception process including the decoding process and the combining process have been successful through the wireless interface 120 or the like.

(Reception Buffer 114)

The reception buffer 114 has a functional component that temporality stores the restored MPDU. Furthermore, the reception buffer 114 may temporality store a portion, which is free from an error in the decoding process of a predetermined encoding unit, of the MPDU for which the error correction has been unsuccessful. The reception buffer 114 includes a memory that stores the information.

(Transmission Process Section 115)

The transmission process section 115 performs the transmission process of A-MPDU generated by the MPDU processor 116. More specifically, the transmission process section 115 performs the encoding process on the A-MPDU generated by the MPDU processor 116. The encoding process uses an RS (255, 239) code or the like. That is, as a process of a predetermined encoding unit, the transmission process section 115 partitions data configured as the A-MPDU on the basis of a block length and appends redundancy codes (such as FECs) thereto. Furthermore, the transmission process section 115 appends the physical layer header, the physical layer trailer, or the like to the data with the redundancy codes appended thereto, thereby generating transmission data.

The transmission process section 115 then generates a baseband signal by performing a modulation process on the transmission data and generates a transmission signal by performing up-conversion on the baseband signal. The transmission process section 115 provides the transmission signal to the antenna controller 111.

(MPDU Processor 116)

The MPDU processor 116 performs an MPDU-related process in the transmission process. For example, the MPDU processor 116 uses information stored in the transmission buffer 117 to construct MPDU having a MAC header appended thereto. The MAC header includes destination information or the like. The MPDU processor 116 then sets the sequence number information (Seq. No.) for each constructed MPDU to manage the data length information (Length) of the MPDU.

Further, the MPDU processor 116 also functions as a generator that generates A-MPDU by aggregating MPDUs until a predetermined data length is reached or a predetermined number of blocks is reached. In addition, as described above, the MPDU processor 116 may store a plurality of identical MPDUs for retransmission in A-MPDU as long as the frame configuration of the A-MPDU has the capacity.

(Transmission Buffer 117)

The transmission buffer 117 has a functional component that temporarily stores information that is wirelessly transmitted and provided from any application through the wireless interface 120. The transmission buffer 117 includes a memory that stores the information.

(Wireless Interface 120)

The wireless interface 120 is an interface for the wireless communication unit 110 and is a functional component that allows information to be exchanged between the wireless communication unit 110 and any application.

(Controller 130)

The controller 130 is a functional component that centrally manages all processes by the STA 100. The control unit 130 is achieved by various IC chips and the like each including CPU (Central Processing Unit), ROM (Read Only Memory), RAM (Random Access Memory), and the like for example.

(Wired Interface 140)

The wired interface 140 is, for example, an interface for any external device, and is a functional component that allows information to be exchanged between the STA 100 and the external device. It should be noted that the wired interface 240 is indispensable for the AP 200 because the wired interface 240 functions as an adapter for coupling to the Internet.

(Input Unit 150)

The input unit 150 is a functional component that receives input of various kinds of information. For example, the input unit 150 includes an input means such as a touch panel, a button, a keyboard, or a microphone, and allows a user to input various kinds of information by using these input means. It should be noted that the AP 200 may omit the input unit 150 or the input unit 150 may have a simpler configuration.

(Output Unit 160)

The output unit 160 is a functional component that outputs various kinds of information. For example, the output unit 160 includes a display means such as a display or a sound output means such as a speaker, and causes the display or the like to display desired information or causes the speaker or the like to generate desired sound information on the basis of a control signal from the controller 130. It should be noted that the AP 200 may omit the output unit 160 or the output unit 160 may have a simpler configuration.

2-5. Operation

The functional components of the AP 200 and the STA 100 have been described above. Next, operations of the AP 200 and the STA 100 are described. It should be noted that the functionality of the present disclosure may be achieved by either the STA 100 or the AP 200 as described above. The following therefore describes, as an example, the operation of the STA 100 functioning as a transmitter and a receiver.

Figure 13A:
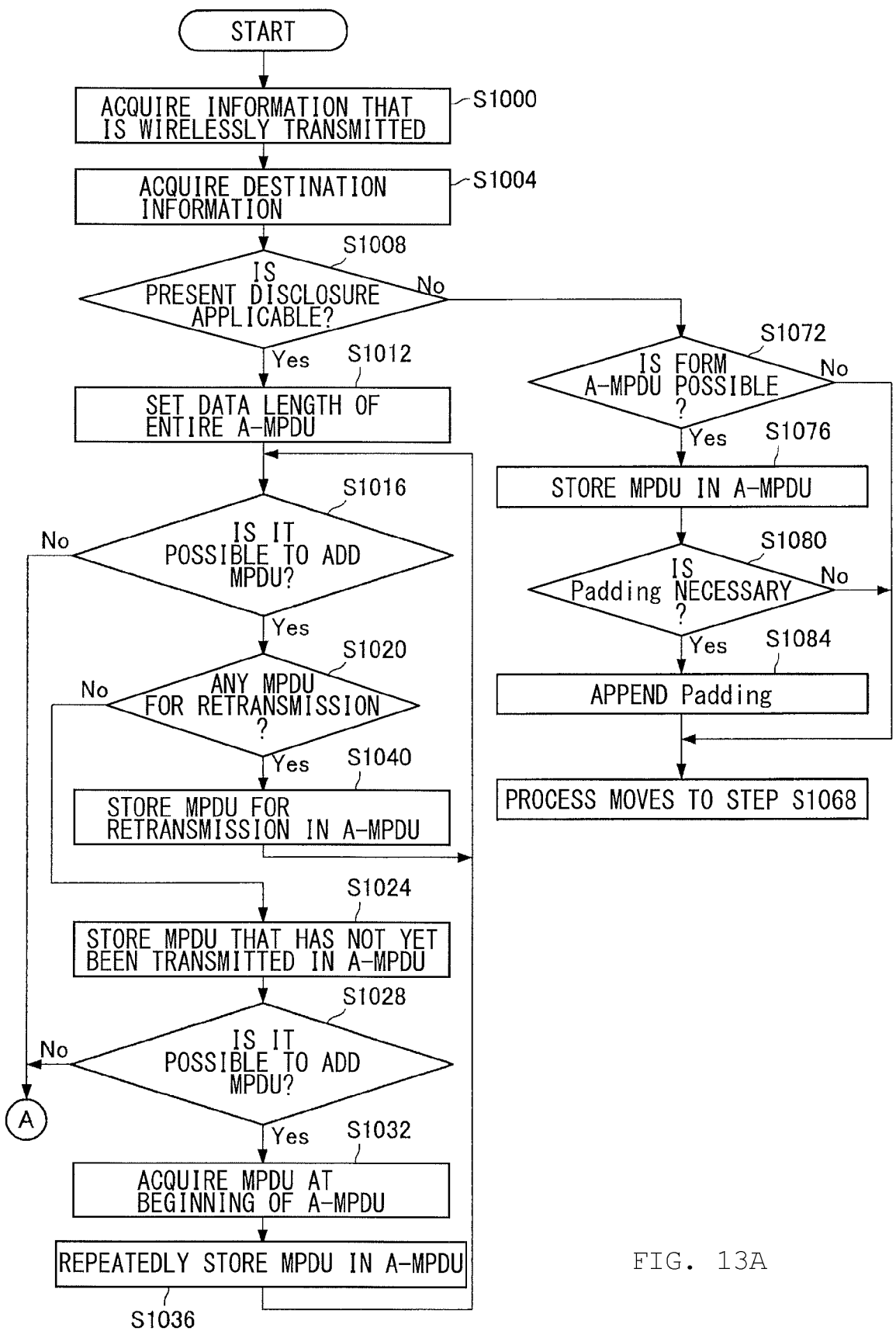
FIG. 13A is a flowchart illustrating an example of a transmission operation.
Figure 13B:
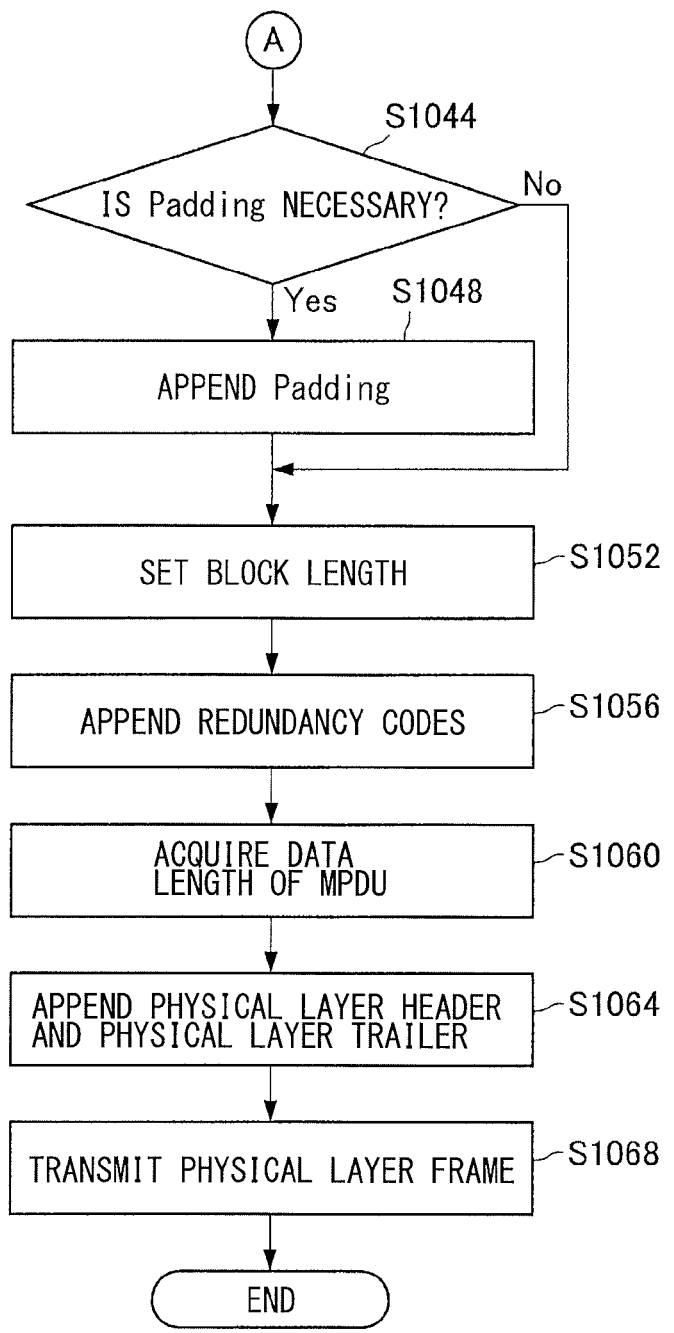
FIG. 13B is a flowchart illustrating an example of the transmission operation.

First, the operation of the STA 100 functioning as the transmitter is described with reference to FIGS. 13A and 13B.

At step S1000, the transmission buffer 117 stores information that is wirelessly transmitted and provided from any application through the wireless interface 120. At step S1004, the MPDU processor 116 acquires destination information of a transmission signal. In a case where a destination receiver is compatible with the technology of the present disclosure (step S1008/Yes), the MPDU processor 116 sets the data length information (Total Length) of the entire A-MPDU at step S1012.

The MPDU processor 116 then determines whether or not a total value of the data lengths of MPDUs to be stored reaches the data length of the entire A-MPDU set in the preceding step. In a case where the total value of the data lengths of the MPDUs to be stored does not reach the data length of the entire A-MPDU, but it is possible to add MPDU (step S1016/Yes), and in a case where there is MPDU for retransmission (step S1020/Yes), the MPDU processor 116 stores the MPDU for retransmission in the A-MPDU at step S1040. The process then returns to step S1016.

In a case where the total value of the data lengths of the MPDUs to be stored does not reach the data length of the entire A-MPDU set in the preceding step, but it is possible to add MPDU (step S1016/Yes), and in a case where there is no MPDU for retransmission (step S1020/No), the MPDU processor 116 stores the MPDU that have not yet been transmitted in the A-MPDU in order of sequence numbers at step S1024.

In a case where the total value of the data lengths of the MPDUs to be stored does not reach the data length of the entire A-MPDU set in the preceding step, but it is possible to add MPDU even after the MPDU that have not yet been transmitted are stored in the A-MPDU (step S1028/Yes), the MPDU processor 116 acquires MPDU stored at the beginning of the A-MPDU again from the transmission buffer 117 at step S1032, and repeatedly stores the MPDU in the A-MPDU at step S1036. The process then returns to step S1016. That is, the MPDU processor 116 repeatedly stores a MPDU for retransmission and MPDU that has not yet been transmitted in the A-MPDU in this order of priority as long as the frame configuration of the A-MPDU has the capacity.

In a case where the frame configuration runs out of the capacity because the total value of the data lengths of the MPDUs to be stored comes close to the data length of the entire A-MPDU set in the preceding step, and it is no longer possible to add MPDU at step S1016 and step S1028 (step S1016/No and step S1028/No), the MPDU processor 116 determines the necessity of Padding at step S1044. In a case where the MPDU processor 116 determines that Padding is necessary (step S1044/Yes), the MPDU processor 116 appends Padding to the end of the A-MPDU at step S1048.

Thereafter, the transmission process section 115 sets a block length for the encoding process using an RS(255,239) code or the like at step S1052, and partitions the data configured as the A-MPDU on the basis of the block length and appends redundancy codes (such as FECs) at step S1056.

Thereafter, the transmission process section 115 acquires the data length information (Length) of each MPDU at step S1060, constructs a physical layer header and a physical layer trailer including encoding process parameters and the like, and appends the physical layer header and the physical layer trailer to the A-MPDU at step S1064. At step S1068, the antenna controller 111 transmits, as a physical layer frame, a signal having the physical layer header and the physical layer trailer appended thereto. The process then ends.

It should be noted that, in a case where the destination receiver is not compatible with the technology of the present disclosure at step S1008 (step S1008/No), the MPDU processor 116 determines whether or not it is possible to configure existing A-MPDU at step S1072. In a case where the MPDU processor 116 determines that it is possible to configure existing A-MPDU (step S1072/Yes), the MPDU processor 116 stores MPDU in the A-MPDU at step S1076.

At step S1080, the MPDU processor 116 determines the necessity of Padding. In a case where the MPDU processor 116 determines that Padding is necessary (step S1080/Yes), the MPDU processor 116 appends Padding to the end of the A-MPDU at step S1048, and the process moves to step S1068. That is, the antenna controller 111 transmits the generated signal as a physical layer frame, and the process ends. It should be noted that the above-described flowchart is merely an example, and is modifiable as appropriate.

Figure 14A:
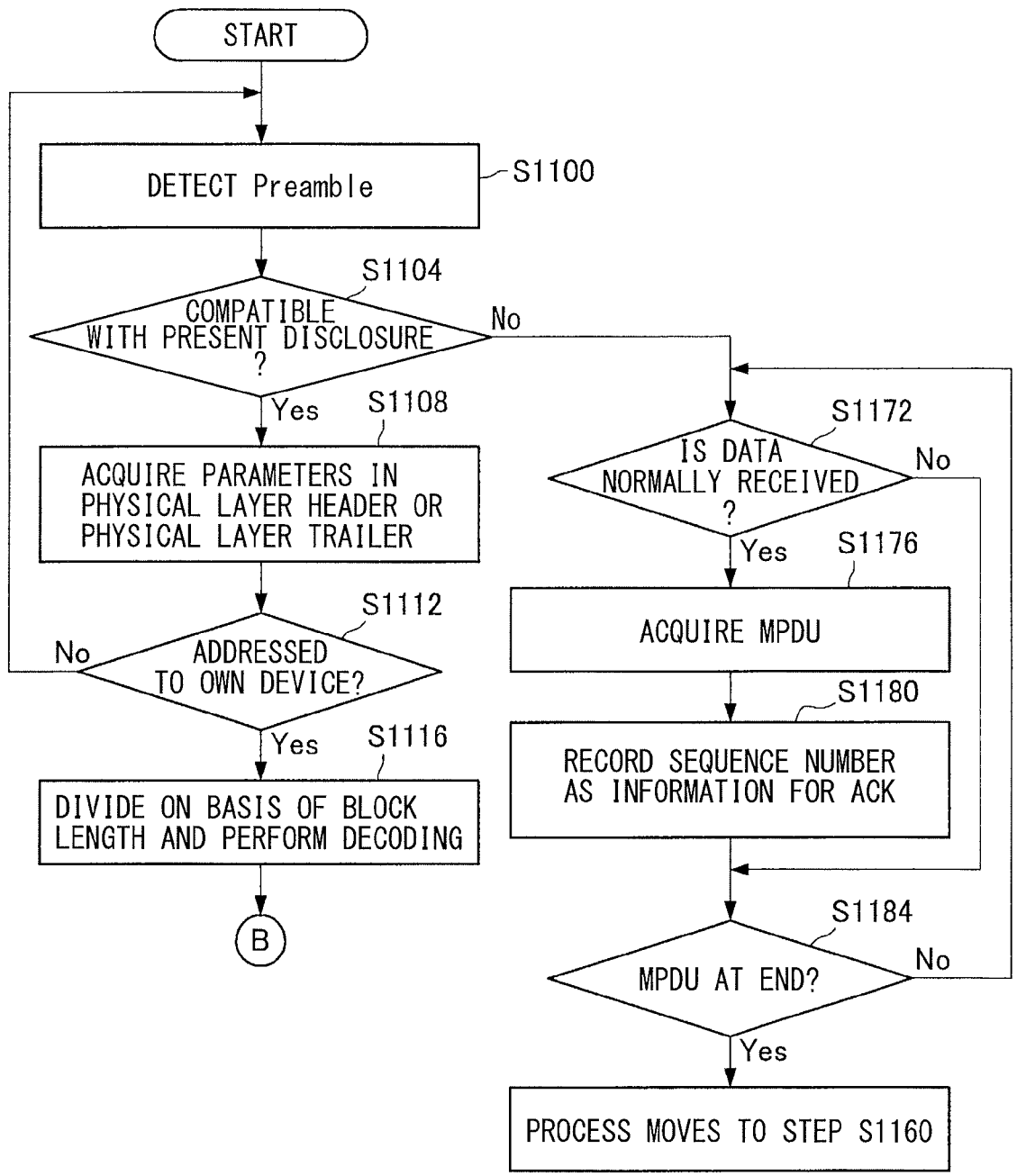
FIG. 14A is a flowchart illustrating an example of a reception operation.
Figure 14B:
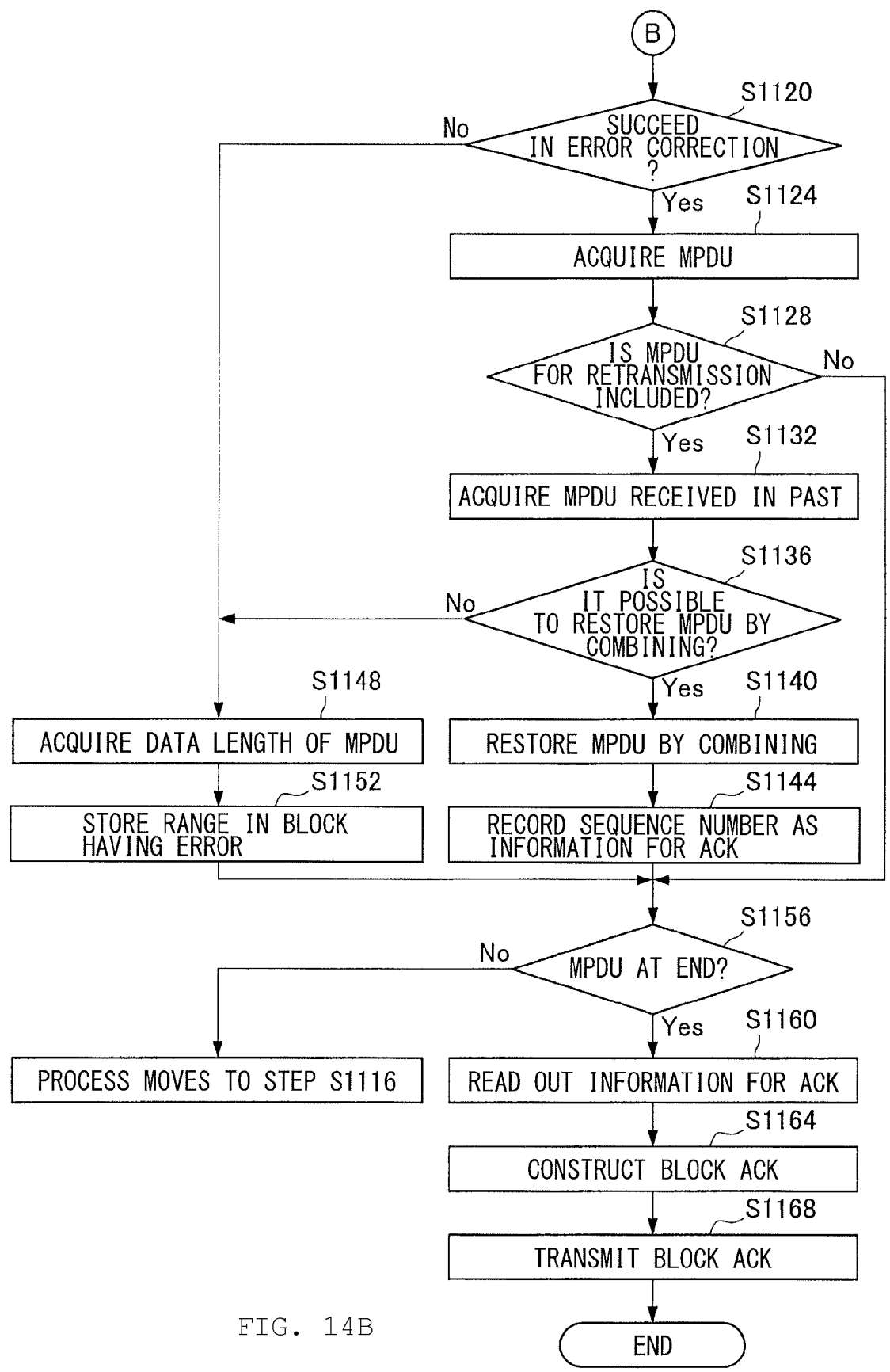
FIG. 14B is a flowchart illustrating an example of the reception operation.

Next, the operation of the STA 100 functioning as the receiver is described with reference to FIGS. 14A and 14B.

At step S1100, the reception process section 112 detects a predetermined preamble (Preamble), thereby detecting a wireless signal. At step S1104, the reception process section 112 determines whether or not the detected wireless signal is compatible with the present disclosure on the basis of all or a portion of the information included in the physical layer header or the arrangement of the physical header. In a case where the detected wireless signal is compatible with the present disclosure (step S1104/Yes), the reception process section 112 acquires parameters included in the physical layer header at step S1108. In a case where the reception process section 112 fails to decode the physical layer header correctly, the reception process section 112 alternatively acquires parameters included in the physical layer trailer.

At step S1112, the reception process section 112 determines whether or not the wireless signal is addressed to the own device on the basis of the recipient address identification information (RXAID) among the acquired parameters. In a case where the wireless signal is addressed to the own device (step S1112/Yes), the reception process section 112 divides the received data on the basis of a block length of a predetermined encoding process and performs the decoding process in units of divided blocks at step S1116.

In a case where an error is detected and the error correction is successful as a result of the decoding process at step S1120 (step S1120/Yes), the MPDU processor 113 acquires MPDU for which the error correction has been successful and stores the MPDU in the reception buffer 114 at step S1124.

At step S1128, the MPDU processor 113 determines whether or not the received A-MPDU includes MPDU for retransmission on the basis of the sequence number information (Seq. No.) of the MPDUs acquired from the physical layer header or the physical layer trailer. In a case where the received A-MPDU includes MPDU for retransmission (step S1128/Yes), the MPDU processor 113 acquires an error-free portion of MPDU received in the past at step S1132.

At step S1136, the MPDU processor 113 determines whether or not it is possible to restore error-free MPDU by combining respective error-free portions from the MPDU received in the past and the MPDU for retransmission. In a case where the MPDU processor 113 determines that it is possible to restore error-free MPDU by combining the error-free portions (step S1136/Yes), the MPDU processor 113 restores the error-free MPDU by performing the combining process at step S1140. At step S1144, the MPDU processor 113 records the sequence number information (Seq. No.) of the successfully restored MPDU as information for ACK.

In a case where the MPDU processor 113 determines that it is not possible to restore error-free MPDU by combining the error-free portions at step S1136 (step S1136/No), the MPDU processor 113 acquires the data length information (Length) of the MPDUs at step S1148, and specifies and stores a range in a block having the error at step S1152. Furthermore, in a case where the received A-MPDU includes no MPDU for retransmission at step S1128 (step S1128/No), the process moves to step S1156.

At step S1156, the MPDU processor 113 determines whether or not the process is complete to the MPDU at the end included in the A-MPDU. In a case where it is determined that the process is not complete to the MPDU at the end (step S1156/No), the process moves to step S1116 and the above-described process on each MPDU is repeated.

In a case where it is determined that the process is complete to the MPDU at the end (step S1156/Yes), the transmission process section 115 reads out the information for ACK at step S1160 and constructs, for example, a block ACK frame including the sequence number information (Seq. No.) of the MPDUs received with no error at step S1164. At step S1168, the antenna controller 111 transmits the constructed block ACK frame, and the process ends.

It should be noted that, in a case where the detected wireless signal is not compatible with the present disclosure at step S1104 (step S1104/No), and in a case where the data is normally received (step S1172/Yes), the MPDU processor 113 acquires the normally received MPDUs and stores the acquired MPDUs in the reception buffer 114 at step S1176. At step S1180, the MPDU processor 113 records the sequence number information (Seq. No.) of the normally received MPDU as information for ACK. In a case where the data is not normally received at step S1172 (step S1172/No), the process moves to step S1184.

At step S1184, the MPDU processor 113 determines whether or not the process is complete to the MPDU at the end included in the A-MPDU. In a case where it is determined that the process is not complete to the MPDU at the end (step S1184/No), the process moves to step S1172 and the above-described process on each MPDU is repeated.

In a case where it is determined that the process is complete to the MPDU at the end (step S1184/Yes), the process moves to step S1160. That is, the processes at step S1160 and the following steps are performed, thereby transmitting a block ACK frame. The process ends. It should be noted that the above-described flowchart is merely an example, and is modifiable as appropriate.

3. MODIFICATION EXAMPLES

The operations of the AP 200 and the STA 100 have been described above. Next, modification examples of the present disclosure are described.

3-1. Application to MPDU Shorter than Block Length

In the above-described embodiment, the block length of the encoding process is shorter than that of the MPDU that is a data unit in which the retransmission process is performed. However, the block length of the encoding process may be greater than that of the MPDU. The following therefore describes a case where the block length of the encoding process is greater than that of the MPDU with reference to FIGS. 15 and 16.

Figure 15:
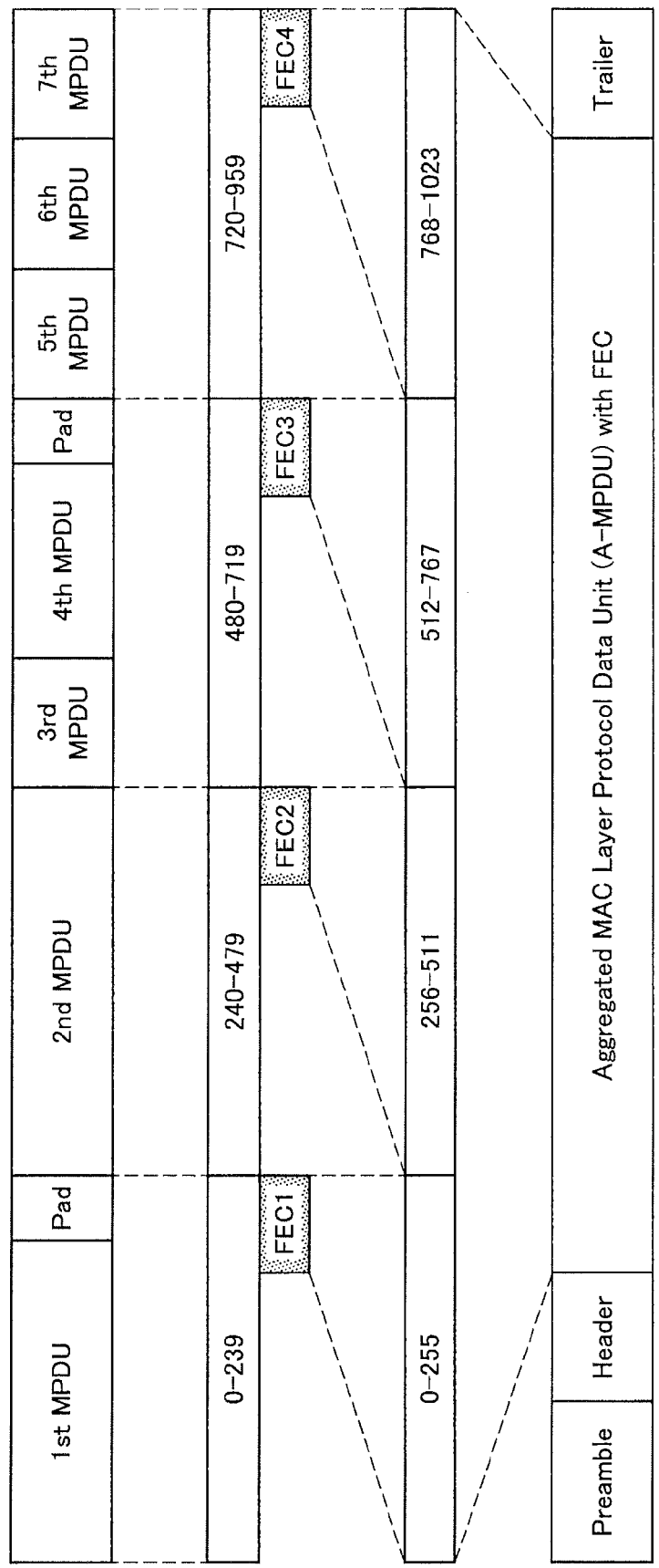
FIG. 15 is a diagram describing an overview of an encoding process in a case where a block length is greater than that of MPDU.

In an example illustrated in FIG. 15, the transmitter aggregates first MPDU (1st MPDU) to seventh MPDU (7th MPDU). The transmitter then appends Padding (Pad) to MPDU shorter than the block length as necessary. For example, the data length of the 1st MPDU is shorter than the block length, and therefore the transmitter appends Padding (Pad) thereto. Furthermore, a total value of the respective data lengths of the 3rd MPDU and the 4th MPDU is also shorter than the block length, and therefore the transmitter appends Padding (Pad) thereto. By contrast, the data length of the 2nd MPDU is equal to the block length, and therefore the transmitter does not append Padding (Pad) thereto.

In addition, in a case where a total value of the respective data lengths of a plurality of MPDUs is equal to the block length, the transmitter stores the plurality of MPDUs in one block without appending Padding (Pad) thereto. For example, a total value of the respective data lengths of the 5th MPDU, the 6th MPDU, and the 7th MPDU is equal to the block length, and therefore the transmitter stores these MPDUs in one block.

The contents of the encoding process illustrated in FIG. 15 are similar to those have been described with reference to FIG. 5. Accordingly, detailed description thereof is omitted. That is, the transmitter performs the encoding process by using, for example, an RS (255, 239) code.

The transmitter then generates a data frame obtained by appending the predetermined preamble (Preamble), the physical layer header (Header), and the physical layer trailer (Trailer) to the data subjected to the encoding process. The configuration of the physical layer header (Header) and the physical layer trailer (Trailer) is similar to the configuration described with reference to FIGS. 2 and 3. Accordingly, description thereof is omitted.

Figure 16:
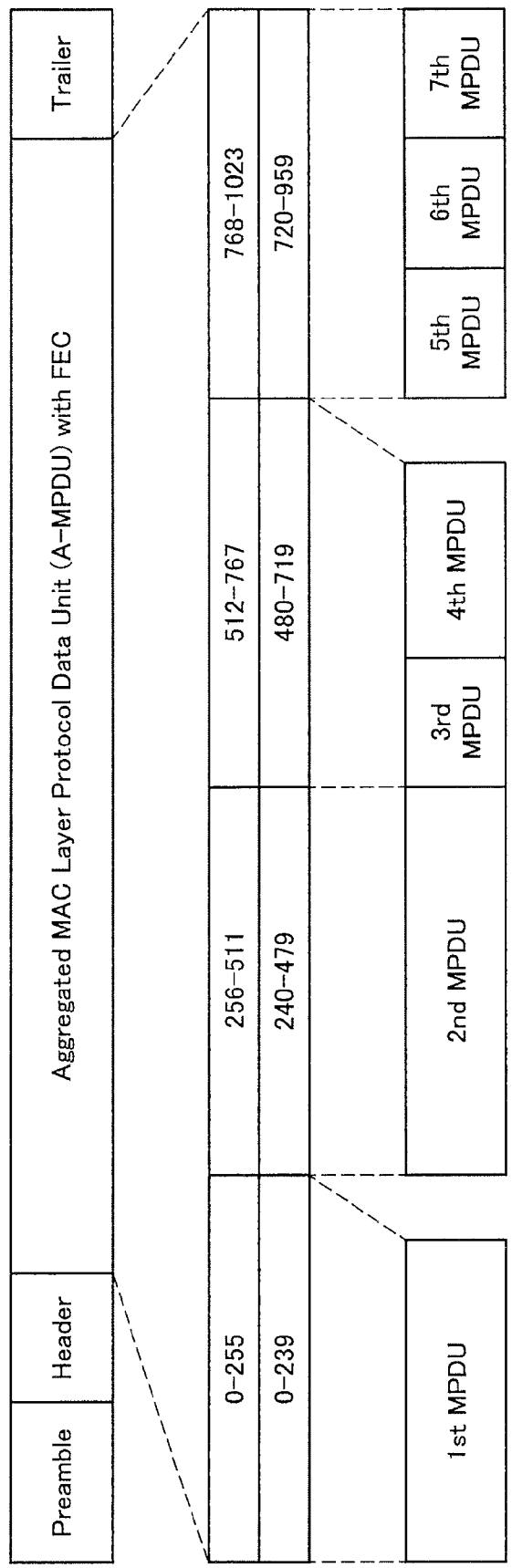
FIG. 16 is a diagram describing an overview of a decoding process in a case where a block length is greater than that of MPDU.

In addition, the contents of the decoding process illustrated in FIG. 16 are similar to those have been described with reference to FIG. 6. Accordingly, detailed description thereof is omitted. That is, the receiver acquires various parameters included in the physical layer header (Header) or the physical layer trailer (Trailer), and grasps the block length of the encoding process on the basis of the encoding format information (Type) or the like of the parameters. The receiver then performs error detection and error correction by extracting redundancy information from the encoded information.

Here, the receiver stores a block for which the error correction has been unsuccessful. Similarly to the embodiment described above, the receiver then requests the transmitter to retransmit the MPDU for which the error correction has been unsuccessful, and restores error-free MPDU by combining respective error-free blocks from the retransmitted MPDU and the MPDU transmitted in the past, thereby succeeding in the reception process.

As described above, the present disclosure is applicable to the case where the block length of the encoding process is greater than that of the MPDU.

3-2. Application to A-MSDU

As for the above-described embodiment, a case where the present disclosure is applied to A-MPDU has been described. However, the present disclosure may be applied to A-MSDU. The following therefore describes a case where the present disclosure is applied to A-MSDU with reference to FIGS. 17 to 19.

Figure 17:
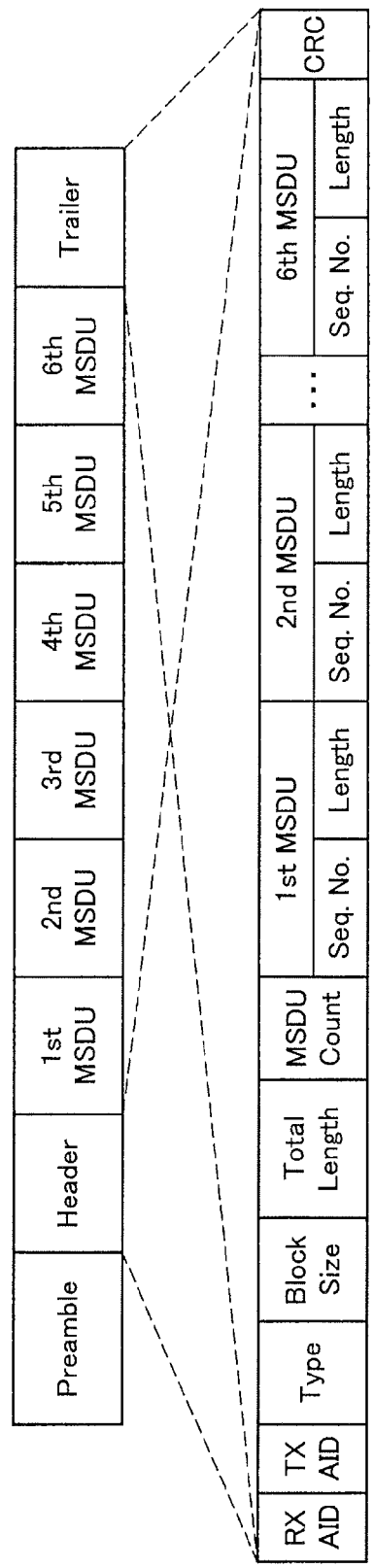
FIG. 17 is a diagram illustrating an example of a configuration of a physical layer header and a physical layer trailer in a case where the present disclosure is applied to A-MSDU.

First, a physical layer header (Header) and a physical layer trailer (Trailer) of the A-MSDU are described with reference to FIG. 17. As illustrated in FIG. 17, the physical layer header (Header) and the physical layer trailer (Trailer) of the A-MSDU include information such as recipient address identification information (RXAID), transmitter address identification information (TXAID), encoding format information (Type), encoding process block length information (Block Size), data length information (Total Length) of the entire A-MSDU, information (MSDU Count) of the number of MSDUs to be aggregated, sequence number information (Seq. No.) of the MSDUs and data length information (Length) of the MSDU as the information for use in identification of each MSDU, and an error detection code (CRC).

It should be noted that FIG. 17 is merely an example, but the configuration of the physical layer header (Header) and the physical layer trailer (Trailer) of the A-MSDU is not limited thereto. For example, the sequence number information (Seq. No.) of the MSDUs may be replaced with a starting sequence number (Start Sequence) and information (Sequence Bitmap) indicating the sequence number of the MSDUs included in the subsequent A-MSDU in a bitmap format.

Next, an overview of an encoding process is described with reference to FIG. 18.

Figure 18:
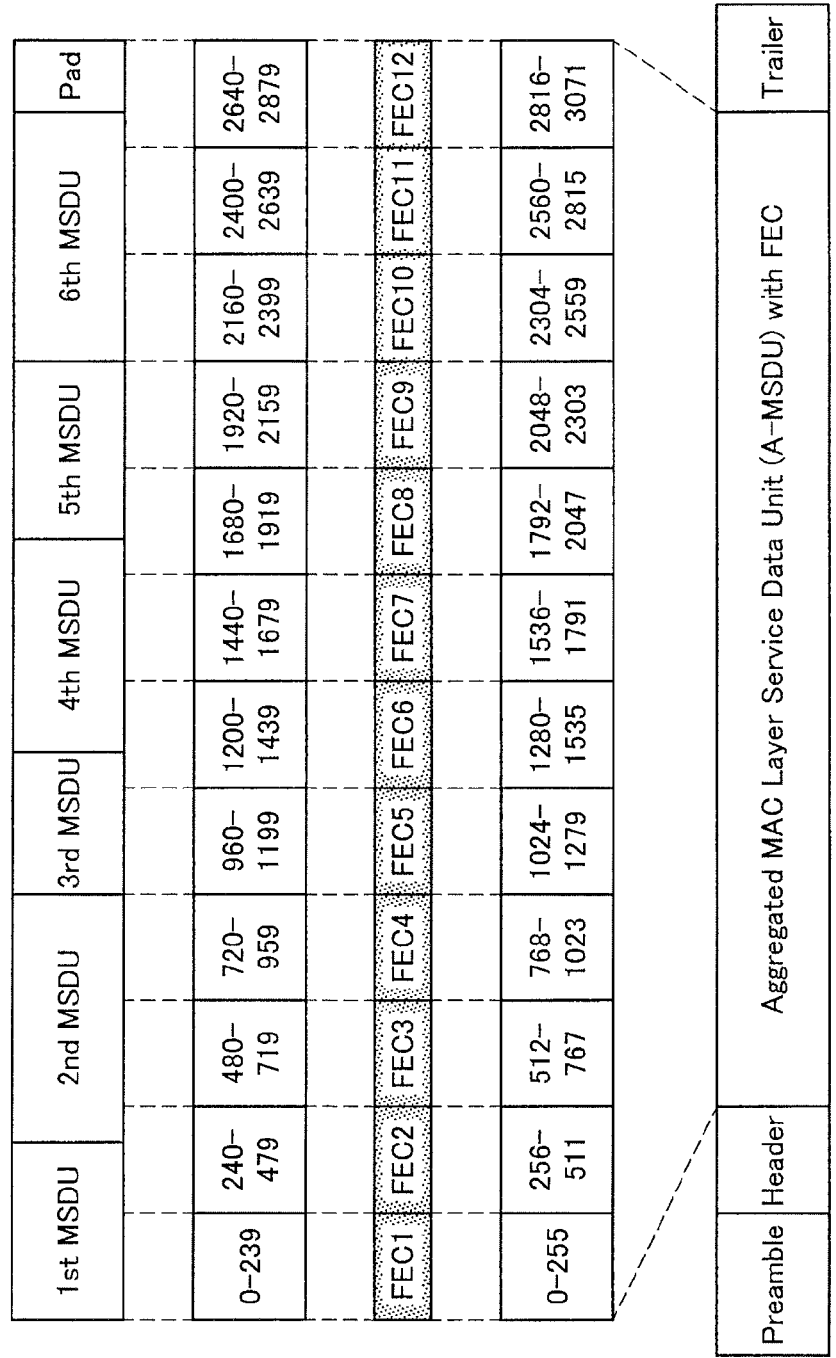
FIG. 18 is a diagram describing an overview of an encoding process in the case where the present disclosure is applied to the A-MSDU.

In an example illustrated in FIG. 18, the transmitter targets, for the encoding process, data obtained by aggregating first MSDU (1st MSDU) to sixth MSDU (6th MSDU) and appending Padding (Pad) thereto as appropriate.

The contents of the encoding process illustrated in FIG. 18 are similar to those have been described with reference to FIG. 5. Accordingly, detailed description thereof is omitted. That is, the transmitter performs the encoding process by using, for example, an RS (255, 239) code.

The transmitter then generates a data frame obtained by appending the predetermined preamble (Preamble), the physical layer header (Header), and the physical layer trailer (Trailer) to the data subjected to the encoding process.

In addition, the contents of the decoding process illustrated in FIG. 19 are similar to those have been described with reference to FIG. 6. Accordingly, detailed description thereof is omitted. That is, the receiver acquires various parameters included in the physical layer header (Header) or the physical layer trailer (Trailer), and grasps the block length of the encoding process on the basis of the encoding format information (Type) or the like of the parameters. The receiver then performs error detection and error correction by extracting redundancy information from the encoded information.

Here, the receiver stores a block for which an error has been detected and the error correction has been unsuccessful. More specifically, the receiver specifies MSDU for which the error correction has been unsuccessful and a range in the MSDU for which the error correction has been unsuccessful on the basis of the data length information (Length) of each MSDU and the sequence number information (Seq. No.) of each MSDU included in the physical layer header (Header) or the physical layer trailer (Trailer), and stores the information.

The receiver then requests the transmitter to retransmit the MPDU for which the error correction has been unsuccessful, by transmitting a block ACK frame and the like to the transmitter, and restores error-free MSDU by combining respective error-free blocks from the retransmitted MSDU and the MSDU transmitted in the past, thereby succeeding in the reception process.

As described above, the present disclosure is also applicable to A-MSDU.

3-3. Case where MPDU Is Configured by Aggregating Plurality of MSDUs

Next, a case where an MPDU is configured by aggregating a plurality of MSDUs is described.

Figure 20:
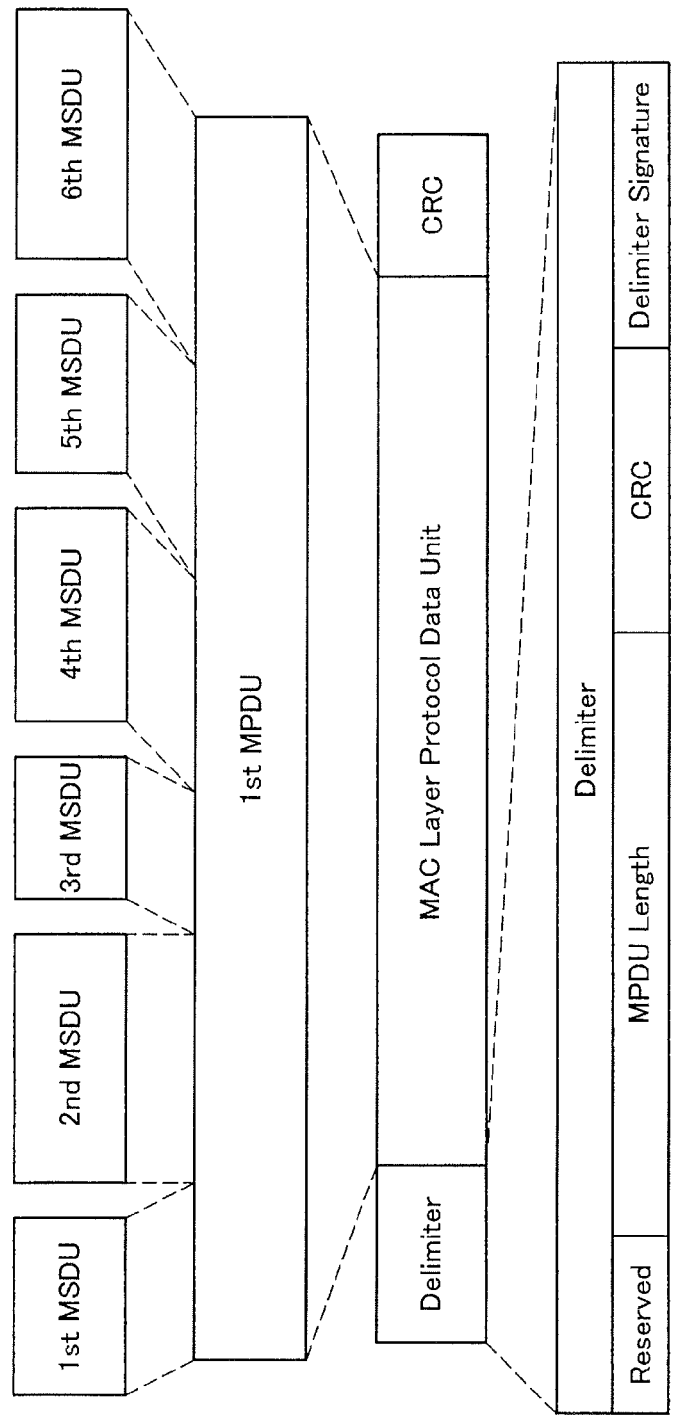
FIG. 20 is a diagram describing a case where one MPDU includes a plurality of aggregated MSDUs.

For example, as illustrated in FIG. 20, the transmitter may construct a frame by aggregating six MSDUs (1st MSDU to 6th MSDU) into one MPDU (1st MPDU). The transmitter then appends delimiter information (Delimiter) and an error detection code (CRC) to the MPDU. It should be noted that the contents of the delimiter information (Delimiter) are similar to the contents described with reference to FIG. 4. Accordingly, description thereof is omitted.

Figure 21:
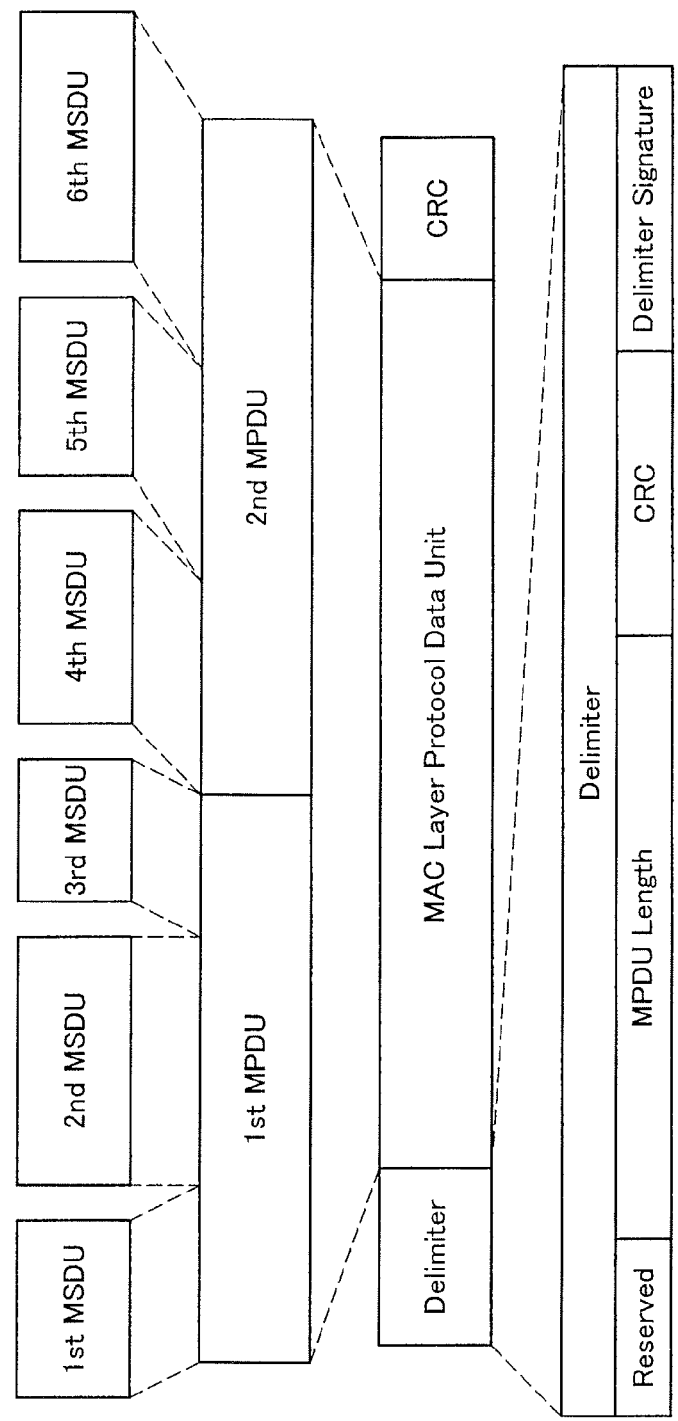
FIG. 21 is a diagram describing a case where MPDUs including a plurality of aggregated MSDUs are further aggregated.

In addition, a plurality of MPDUs may be configured instead of one MPDU by aggregating a plurality of MSDUs. For example, as illustrated in FIG. 21, the transmitter may aggregate three MSDUs (1st MSDU to 3rd MSDU) into one MPDU (1st MPDU), aggregate other three MSDUs (4th MSDU to 6th MSDU) into another MPDU (2nd MPDU), and then further aggregate the two MPDUs to construct one frame.

In this case, similarly to the above, the receiver restores error-free MSDU by combining respective error-free blocks of retransmitted MSDU and MSDU transmitted in the past, thereby succeeding in the reception process.

As described above, the present disclosure is also applicable to the case where MPDU is configured by aggregating a plurality of MSDUs.

3-4. Variations of Storage Position of Physical Layer Header

Next, variations of the storage position of the physical layer header (Header) are described with reference to FIGS. 22 to 29.

Figure 22:
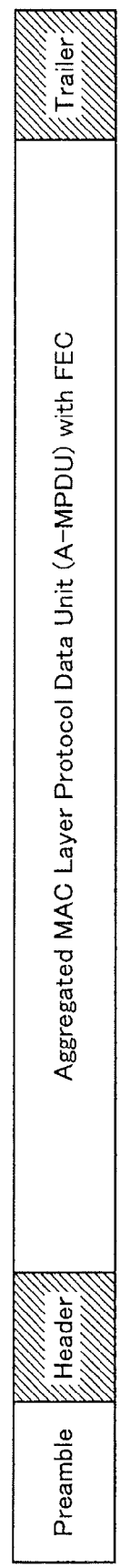
FIG. 22 is a diagram describing a variation of a storage position of the physical layer header.

In the above-described example, the physical layer header (Header) is stored between the predetermined preamble (Preamble) and the MPDU at the beginning of the A-MPDU as illustrated in FIG. 22 (it should be noted that the physical layer trailer (Trailer) including the same information as that of the physical layer header (Header) is also appended to the end). However, the storage position of the physical layer header (Header) is not limited thereto.

Figure 23:
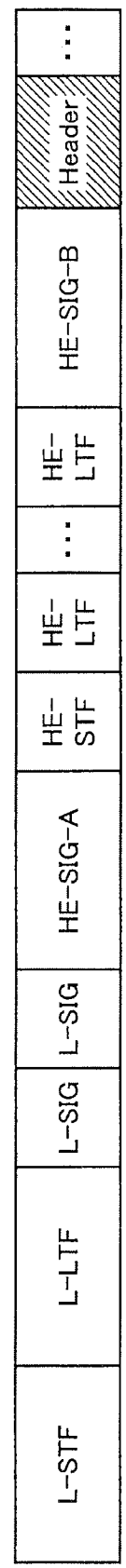
FIG. 23 is a diagram describing a variation of the storage position of the physical layer header.

For example, as illustrated in FIG. 23, the physical layer header (Header) may be stored between the PLCP header and the MPDU at the beginning of the A-MPDU. Here, in FIG. 23, a legacy short training field (L-STF), a legacy long training field (L-LTF), legacy signaling (L-SIG), high efficiency signaling A (HE-SIG-A), a high efficiency short training field (HE-STF), a predetermined number of high efficiency short training fields (HE-LTF), and high efficiency signaling B (HE-SIG-B) are included as a traditional preamble.

Figure 24:
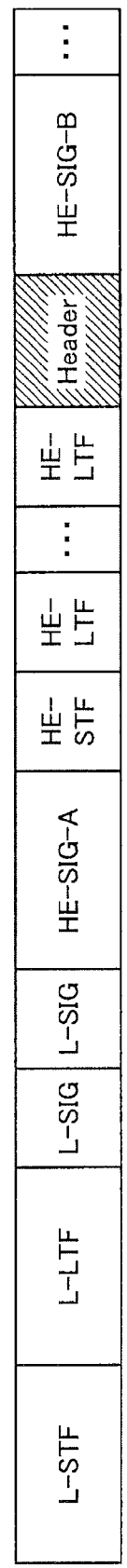
FIG. 24 is a diagram describing a variation of the storage position of the physical layer header.

In addition, as illustrated in FIG. 24, the physical layer header (Header) may be stored between a predetermined number of high efficiency short training fields (HE-LTF) and the high efficiency signaling B (HE-SIG-B).

Figure 25:
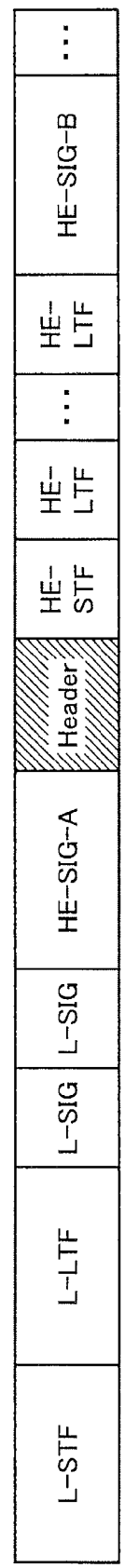
FIG. 25 is a diagram describing a variation of the storage position of the physical layer header.

In addition, as illustrated in FIG. 25, the physical layer header (Header) may be stored between the high efficiency signaling A (HE-SIG-A) and the high efficiency short training field (HE-STF).

Figure 26:
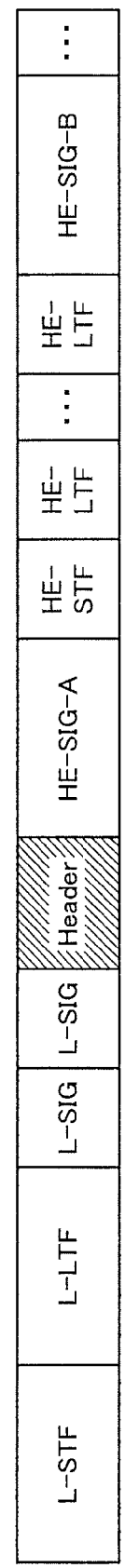
FIG. 26 is a diagram describing a variation of the storage position of the physical layer header.

In addition, as illustrated in FIG. 26, the physical layer header (Header) may be stored between the legacy signaling (L-SIG) and the high efficiency signaling A (HE-SIG-A).

Figure 27:
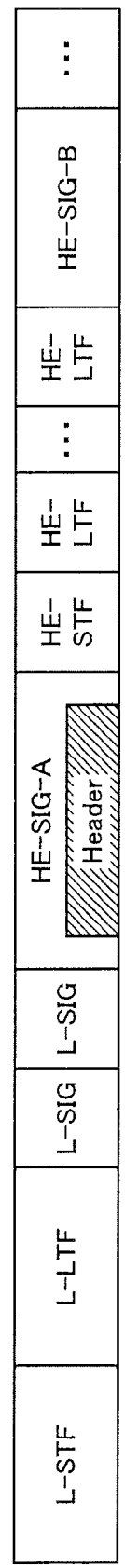
FIG. 27 is a diagram describing a variation of the storage position of the physical layer header.

In addition, as illustrated in FIG. 27, the physical layer header (Header) may be configured as a portion of the high efficiency signaling A (HE-SIG-A).

Figure 28:
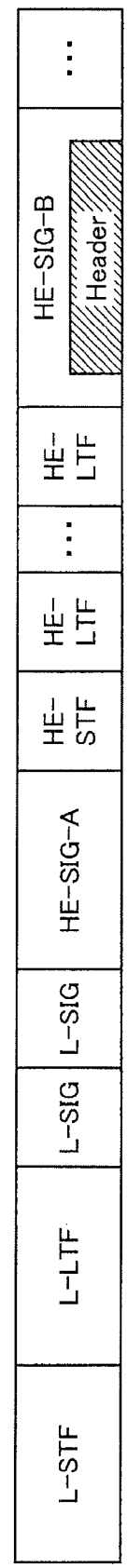
FIG. 28 is a diagram describing a variation of the storage position of the physical layer header.

In addition, as illustrated in FIG. 28, the physical layer header (Header) may be configured as a portion of the high efficiency signaling B (HE-SIG-B).

Figure 29:
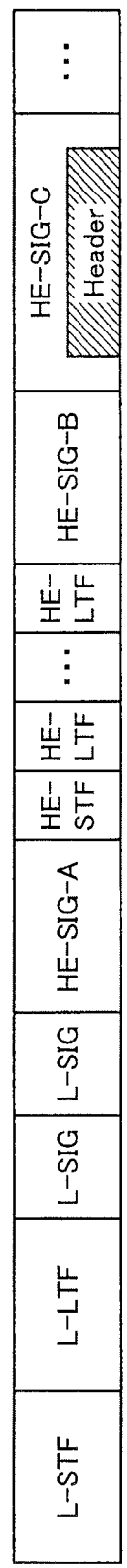
FIG. 29 is a diagram describing a variation of the storage position of the physical layer header.

In addition, as illustrated in FIG. 29, the physical layer header (Header) may be configured as a portion of newly defined high efficiency signaling C (HE-SIG-C).

It should be noted that, in FIGS. 23 to 29, the physical layer trailer (Trailer) including the same information as that of the physical layer header (Header) may be appended to the end of the frame as in FIG. 22, or only the physical layer trailer (Trailer) may be appended to the end of the frame with the physical layer header (Header) omitted.

As described above, the storage position of the physical layer header (Header) may take various variations.

4. APPLICATION EXAMPLES

The technology according to the present disclosure is applicable to various products. For example, the STA 100 may be achieved as a mobile terminal such as a smartphone, tablet PC (Personal Computer), notebook PC, a portable game terminal, or a digital camera; a fixed terminal such as a television receiver, a printer, a digital scanner, or a network storage; or an on-vehicle terminal such as a car navigation apparatus. In addition, the STA 100 may be achieved as a terminal (also referred to as MTC (Machine Type Communication) terminal) that performs M2M (Machine To Machine) communication such as a smart meter, a vending machine, a remote monitoring device, or a POS (Point Of Sale) terminal. Further, the STA 100 may be a wireless communication module (for example, integrated circuit module including one die) mounted on these terminals.

By contrast, for example, the AP 200 may be achieved as a wireless LAN access point (also referred to as wireless base station) with or without a router function. In addition, the AP 200 may be achieved as a mobile wireless LAN router. Further, the AP 200 may be a wireless communication module (for example, integrated circuit module including one die) mounted on these devices.

4-1. First Application Example

Figure 30:
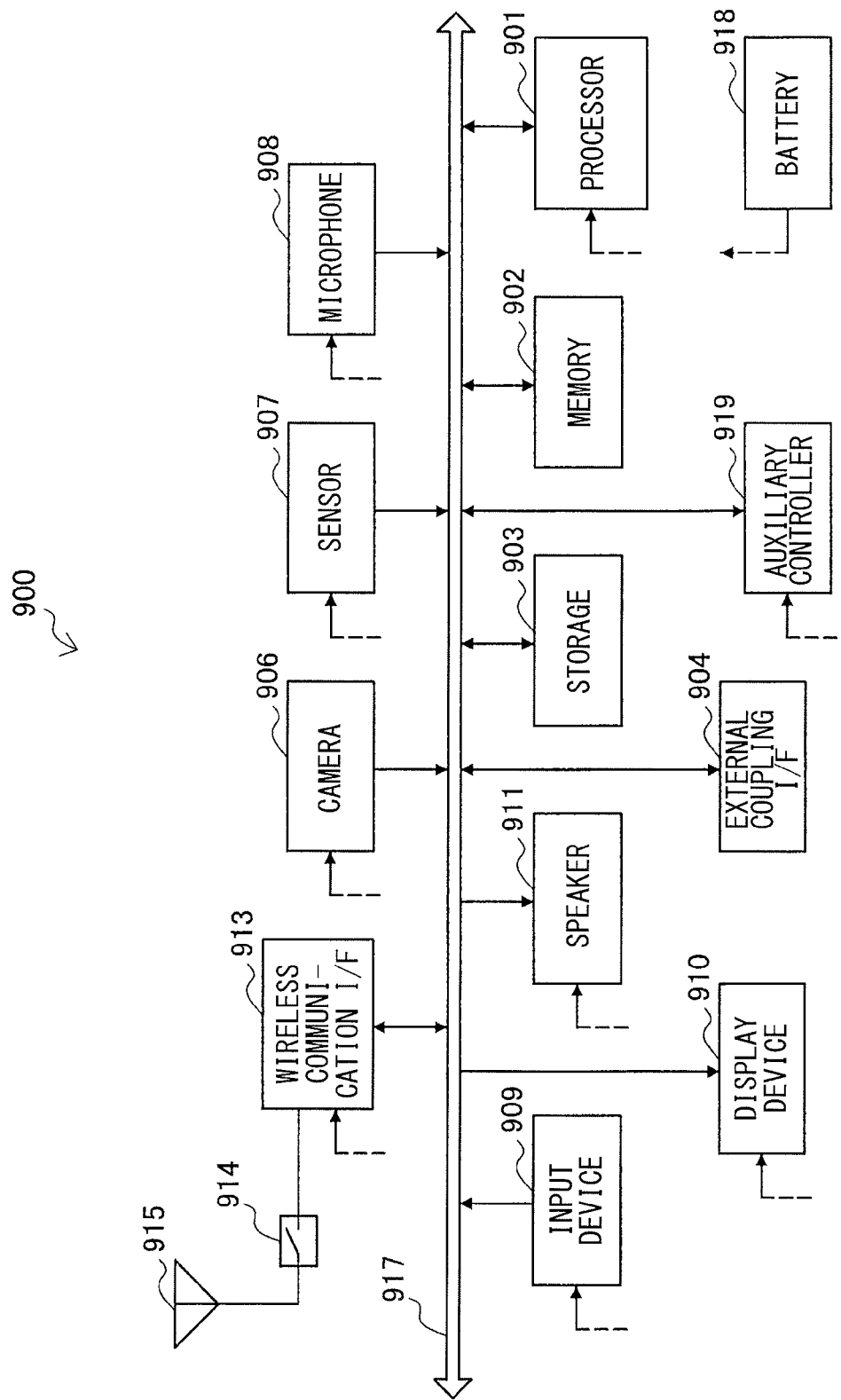
FIG. 30 is a block diagram illustrating an example of a schematic configuration of a smartphone.

FIG. 30 is a block diagram illustrating an example of a schematic configuration of a smartphone 900 to which the technology according to the present disclosure may be applied. The smartphone 900 includes a processor 901, a memory 902, a storage 903, an external coupling interface 904, a camera 906, a sensor 907, a microphone 908, an input device 909, a display device 910, a speaker 911, a wireless communication interface 913, an antenna switch 914, an antenna 915, a bus 917, a battery 918, and an auxiliary controller 919.

The processor 901 may be, for example, CPU (Central Processing Unit) or SoC (System on Chip), and controls the functions of an application layer and other layers of the smartphone 900. The memory 902 includes RAM (Random Access Memory) and ROM (Read Only Memory), and stores a program to be executed by the processor 901 and data. The storage 903 may include a storage medium such as a semiconductor memory or a hard disk. The external coupling interface 904 is an interface for coupling an externally attached device such as a memory card or a USB (Universal Serial Bus) device to the smartphone 900.

The camera 906 includes, for example, an imaging element such as CCD (Charge Coupled Device) or CMOS (Complementary Metal Oxide Semiconductor), and generates a captured image. The sensor 907 may include a sensor group including, for example, a positioning sensor, a gyro sensor, a geomagnetic sensor, an acceleration sensor and the like. The microphone 908 converts a sound that is inputted into the smartphone 900 to a sound signal. The input device 909 includes, for example, a touch sensor that detects a touch onto a screen of the display device 910, a key pad, a keyboard, a button, a switch, or the like, and receives an operation or an information input from a user. The display device 910 includes a screen such as a liquid crystal display (LCD) or an organic light-emitting diode (OLED) display, and displays an output image of the smartphone 900. The speaker 911 converts the sound signal that is outputted from the smartphone 900 to a sound.

The wireless communication interface 913 supports one or more of wireless LAN standards such as IEEE 802.11a, 11b, 11g, 11n, 11ac, and 11ad, and executes wireless communication. The wireless communication interface 913 may communicate with another device via a wireless LAN access point in an infrastructure mode. Furthermore, the wireless communication interface 913 may directly communicate with another device in an ad-hoc mode or a direct communication mode such as Wi-Fi Direct (registered trademark). It should be noted that, in Wi-Fi Direct, unlike the ad-hoc mode, one of two terminals operates as an access point, but these terminals directly communicate with each other. Typically, the wireless communication interface 913 may include a baseband processor, an RF (Radio Frequency) circuit, a power amplifier, and the like. The wireless communication interface 913 may be a one-chip module in which a memory that stores a communication control program, a processor that executes the program, and a related circuit are integrated. The wireless communication interface 913 may support another type of wireless communication scheme such as a short-range wireless communication scheme, a near field communication scheme, or a cellular communication scheme in addition to a wireless LAN scheme. The antenna switch 914 switches a coupling destination of the antenna 915 between a plurality of circuits (for example, circuits for different wireless communication schemes) included in the wireless communication interface 913. The antenna 915 includes one or more antenna elements (for example, a plurality of antenna elements included in a MIMO antenna), and is used for transmission and reception of the wireless signal by the wireless communication interface 913.

It should be noted that the smartphone 900 is not limited to the example illustrated in FIG. 30, but may include a plurality of antennas (for example, an antenna for wireless LAN and an antenna for a near field communication scheme). In that case, the antenna switch 914 may be omitted from the configuration of the smartphone 900.

The bus 917 couples the processor 901, the memory 902, the storage 903, the external coupling interface 904, the camera 906, the sensor 907, the microphone 908, the input device 909, the display device 910, the speaker 911, the wireless communication interface 913, and the auxiliary controller 919 to each other. The battery 918 supplies electric power to each block of the smartphone 900 illustrated in FIG. 30 via a power supply line that is partially illustrated in the diagram as a dashed line. The auxiliary controller 919, for example, operates a minimally necessary function of the smartphone 900 in a sleep mode.

It should be noted that the smartphone 900 may operate as a wireless access point (software AP) through the processor 901 executing an application-level access point function. In addition, the wireless communication interface 913 may have a wireless access point function.

4-2. Second Application Example

Figure 31:
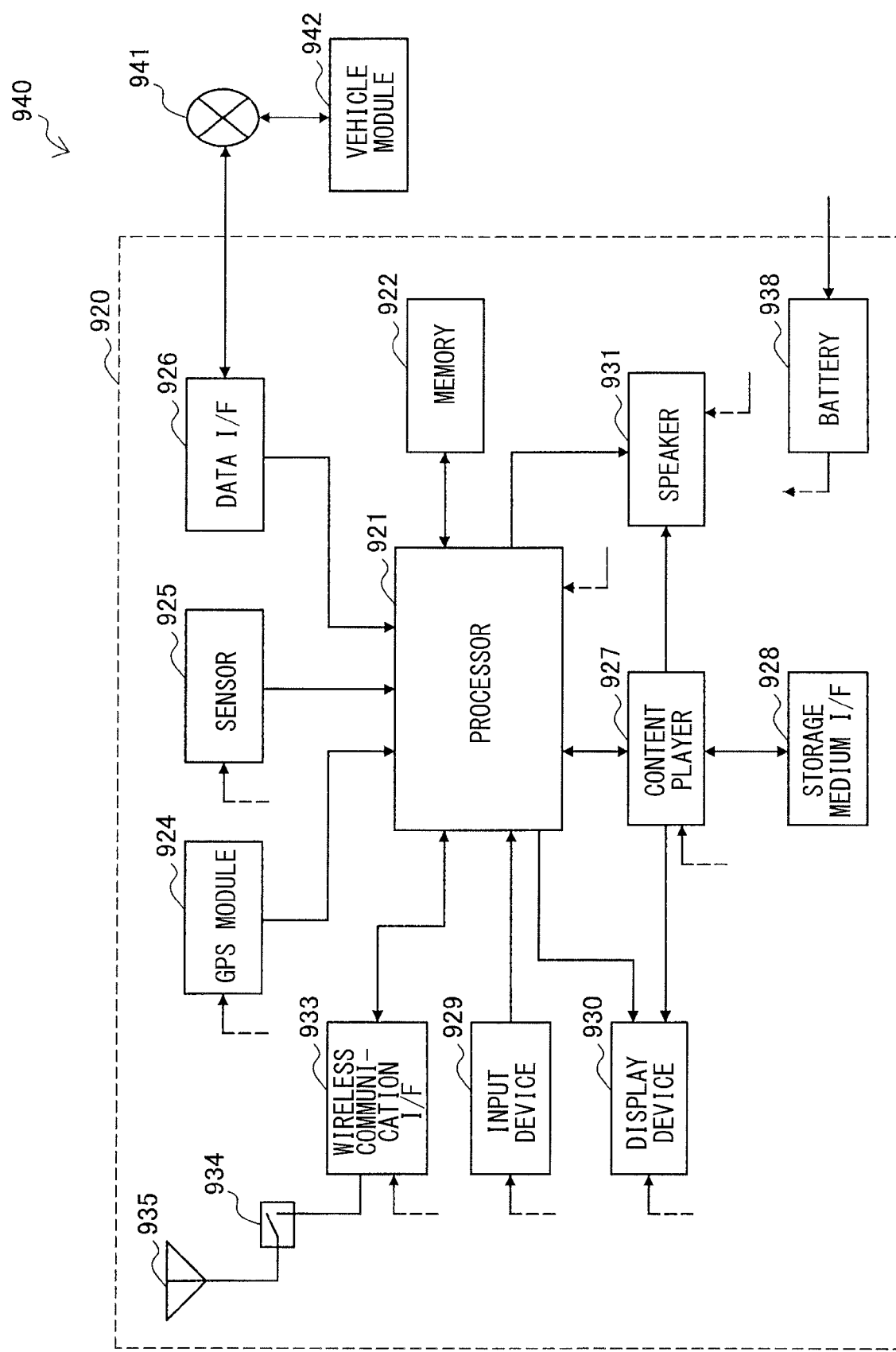
FIG. 31 is a block diagram illustrating an example of a schematic configuration of a car navigation apparatus.

FIG. 31 is a block diagram illustrating an example of a schematic configuration of a car navigation apparatus 920 to which the technology according to the present disclosure may be applied. The car navigation apparatus 920 includes a processor 921, a memory 922, a GPS (Global Positioning System) module 924, a sensor 925, a data interface 926, a content player 927, a storage medium interface 928, an input device 929, a display device 930, a speaker 931, a wireless communication interface 933, an antenna switch 934, an antenna 935, and a battery 938.

The processor 921 may be, for example, CPU or SoC, and controls the navigation function and the other functions of the car navigation apparatus 920. The memory 922 includes RAM and ROM, and stores a program to be executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, an atmospheric pressure sensor and the like. The data interface 926 is, for example, coupled to an in-vehicle network 941 via a terminal that is not illustrated, and acquires data such as vehicle speed data generated on the vehicle side.

The content player 927 reproduces content stored in a storage medium (e.g., CD or DVD) to be inserted into the storage medium interface 928. The input device 929 includes, for example, a touch sensor that detects a touch onto a screen of the display device 930, a button, a switch, or the like, and receives an operation or an information input from a user. The display device 930 includes a screen such as LCD or an OLED display, and displays an image of the navigation function or the reproduced content. The speaker 931 outputs a sound of the navigation function or the reproduced content.

The wireless communication interface 933 supports one or more of wireless LAN standards such as IEEE 802.11a, 11b, 11g, 11n, 11ac, and 11ad, and executes wireless communication. The wireless communication interface 933 may communicate with another device via a wireless LAN access point in an infrastructure mode. Furthermore, the wireless communication interface 933 may directly communicate with another device in an ad-hoc mode or a direct communication mode such as Wi-Fi Direct. Typically, the wireless communication interface 933 may include a baseband processor, an RF circuit, a power amplifier, and the like. The wireless communication interface 933 may be a one-chip module in which a memory that stores a communication control program, a processor that executes the program, and a related circuit are integrated. The wireless communication interface 933 may support another type of wireless communication scheme such as a short-range wireless communication scheme, a near field communication scheme, or a cellular communication scheme in addition to a wireless LAN scheme. The antenna switch 934 switches a coupling destination of the antenna 935 between a plurality of circuits included in the wireless communication interface 933. The antenna 935 includes one or more antenna elements, and is used for transmission and reception of the wireless signal by the wireless communication interface 933.

It should be noted that the car navigation apparatus 920 is not limited to the example illustrated in FIG. 31, but may include a plurality of antennas. In that case, the antenna switch 934 may be omitted from the configuration of the car navigation apparatus 920.

The battery 938 supplies electric power to each block of the car navigation apparatus 920 illustrated in FIG. 31 via a power supply line that is partially illustrated in the diagram as a dashed line. In addition, the battery 938 accumulates the electric power supplied from the vehicle side.

In addition, the technology according to the present disclosure may also be achieved as an in-vehicle system (or a vehicle) 940 including one or more blocks of the car navigation apparatus 920 described above, the in-vehicle network 941, and a vehicle module 942. The vehicle module 942 generates vehicle data such as vehicle speed, engine speed, and trouble information, and outputs the generated data to the in-vehicle network 941.

4-3. Third Application Example

Figure 32:
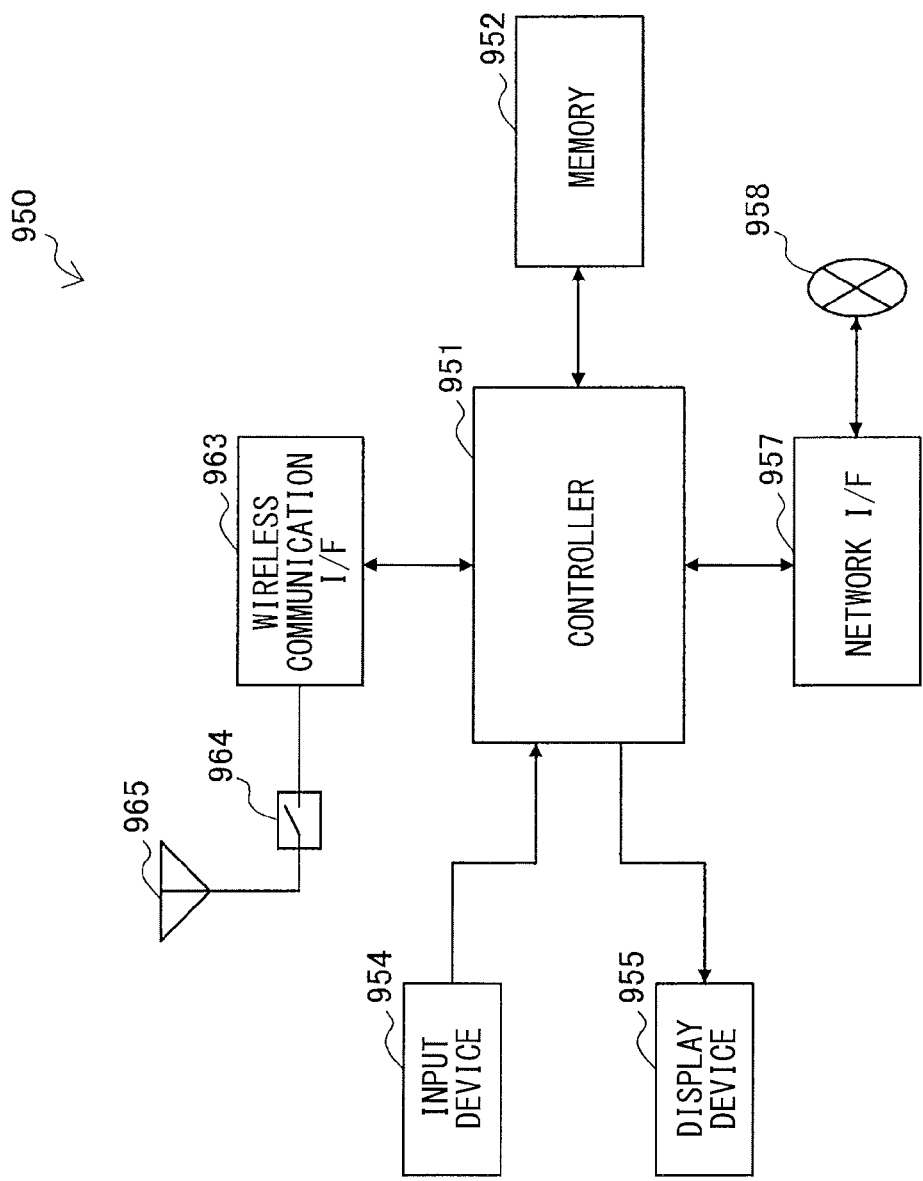
FIG. 32 is a block diagram illustrating an example of a schematic configuration of a wireless access point.

FIG. 32 is a block diagram illustrating an example of a schematic configuration of a wireless access point 950 to which the technology according to the present disclosure may be applied. The wireless access point 950 includes a controller 951, a memory 952, an input device 954, a display device 955, a network interface 957, a wireless communication interface 963, an antenna switch 964, and an antenna 965.

The controller 951 may be, for example, CPU or DSP (Digital Signal Processor), and causes various functions (for example, access restriction, routing, encryption, firewall, log management, and the like) in an IP (Internet Protocol) layer and higher layers of the wireless access point 950 to operate. The memory 952 includes RAM and ROM, and stores a program to be executed by the controller 951 and various kinds of control data (for example, terminal lists, routing tables, encryption keys, security settings, logs, and the like).

The input device 954 includes, for example, a button, a switch, or the like, and receives an operation from a user. The display device 955 includes an LED lamp and the like, and displays an operation status of the wireless access point 950.

The network interface 957 is a wired communication interface for coupling the wireless access point 950 to a wired communication network 958. The network interface 957 may include a plurality of coupling terminals. The wired communication network 958 may be LAN such as Ethernet (registered trademark) or may be WAN (Wide Area Network).

The wireless communication interface 963 supports one or more of wireless LAN standards such as IEEE 802.11a, 11b, 11g, 11n, 11ac, and 11ad, and provides wireless coupling as an access point for a terminal in the vicinity. Typically, the wireless communication interface 963 may include a baseband processor, an RF circuit, a power amplifier, and the like. The wireless communication interface 963 may be a one-chip module in which a memory that stores a communication control program, a processor that executes the program, and a related circuit are integrated. The antenna switch 964 switches a coupling destination of the antenna 965 between a plurality of circuits included in the wireless communication interface 963. The antenna 965 includes one or more antenna elements, and is used for transmission and reception of the wireless signal by the wireless communication interface 963.

5. CONCLUSION

As described above, the wireless LAN system according to the present disclosure performs a combining process of respective error-free blocks from MPDU for which the reception process has been unsuccessful and retransmitted MPDU to restore the MPDU, thereby succeeding in the reception process.

This enables the wireless LAN system to achieve more appropriate retransmission control. More specifically, even if a block in MPDU includes an error, the receiver is able to use error-free portions of the MPDU for the combining process instead of discarding the whole MPDU. It is therefore possible to restore error-free MPDU with a higher probability. Furthermore, the receiver is able to perform the combining process without depending on the block length of the encoding process by managing an error-containing portion of the MPDU in units of bytes.

Furthermore, the wireless LAN system includes, in a physical layer header, information for use in identification of aggregated MPDUs in A-MPDU and appends a physical layer trailer including the same information to the end of a data frame. This enables the wireless LAN system to identify each MPDU even if the data length information included in the delimiter information is incorrect.

Furthermore, the wireless LAN system is able to store a plurality of identical retransmission MPDUs in A-MPDU as long as a frame configuration of the A-MPDU has the capacity. This makes it possible to increase the possibility of succeeding in the combining process.

A preferred embodiment(s) of the present disclosure has/have been described above in detail with reference to the accompanying drawings, but the technical scope of the present disclosure is not limited to such an embodiment(s). A person skilled in the art may find various alterations and modifications within the scope of the appended claims, and it should be understood that theyl naturally come under the technical scope of the present disclosure.

Further, the effects described herein are merely illustrative and exemplary, and not limitative. That is, the technology according to the present disclosure may exert other effects that are apparent to those skilled in the art from the description herein, in addition to the above-described effects or in place of the above-described effects.

It should be noted that the following configurations also fall within the technical scope of the present disclosure.

(1)

A wireless LAN communication device including:

a generator that generates a data frame for which a data unit in which an encoding process is performed and a data unit in which a retransmission process is performed are different from each other, the encoding process making it possible to determine whether or not decoding is successful; and a transmission section that transmits the data frame.

(2)

The wireless LAN communication device according to (1), in which the data unit in which the encoding process is performed is smaller than the data unit in which the retransmission process is performed.

(3)

The wireless LAN communication device according to (1), in which the data unit in which the encoding process is performed is larger than the data unit in which the retransmission process is performed.

(4)

The wireless LAN communication device according to any one of (1) to (3), in which the generator generates the data frame through aggregation of data in the data unit in which the retransmission process is performed.

(5)

The wireless LAN communication device according to (4), in which the generator performs the aggregation until a predetermined data length is reached.

(6)

The wireless LAN communication device according to (5), in which the data frame includes A-MPDU obtained by aggregating MPDUs or A-MSDU obtained by aggregating MSDUs.

(7)

The wireless LAN communication device according to (5) or (6), in which the generator includes a plurality of identical pieces of data for retransmission in the data frame.

(8)

The wireless LAN communication device according to any one of (1) to (7), in which the generator appends, to the data frame, information for use in identification of data to be subjected to the retransmission process.

(9)

The wireless LAN communication device according to (8), in which the information for use in identification of the data includes data length information and sequence number information of the data to be subjected to the retransmission process.

(10)

The wireless LAN communication device according to (8) or (9), in which the generator includes the information for use in identification of the data in a physical layer header or a physical layer trailer appended to the data frame.

(11)

A wireless LAN communication method that is executed by a computer, the wireless LAN communication method including:

generating a data frame for which a data unit in which an encoding process is performed and a data unit in which a retransmission process is performed are different from each other, the encoding process making it possible to determine whether or not decoding is successful; and transmitting the data frame.

(12)

A wireless LAN communication device including:

a reception section that receives a data frame for which a data unit in which an encoding process is performed and a data unit in which a retransmission process is performed are different from each other, the encoding process making it possible to determine whether or not decoding is successful; and a reception process section that performs a reception process including decoding the data frame.

(13)

The wireless LAN communication device according to (12), in which the reception process section specifies a range in data for which the reception process has been unsuccessful, and performs a combining process with a portion of retransmitted data.

(14)

The wireless LAN communication device according to (12) or (13), in which the data frame is generated through aggregation of data in the data unit in which the retransmission process is performed.

(15)

The wireless LAN communication device according to (14), in which the data frame includes A-MPDU obtained by aggregating MPDUs or A-MSDU obtained by aggregating MSDUs.

(16)

The wireless LAN communication device according to (14) or (15), in which the reception process section performs the reception process by using a plurality of identical pieces of data for retransmission included in the data frame.

(17)

The wireless LAN communication device according to any one of (12) to (16), in which the reception process section performs the reception process on a basis of information for use in identification of data to be subjected to the retransmission process, the information being appended to the data frame.

(18)

The wireless LAN communication device according to (17), in which the information for use in identification of the data includes data length information and sequence number information of the data to be subjected to the retransmission process.

(19)

The wireless LAN communication device according to (17) or (18), in which the information for use in identification of the data is included in a physical layer header or a physical layer trailer appended to the data frame.

(20)

A wireless LAN communication method that is executed by a computer, the wireless LAN communication method including:

receiving a data frame for which a data unit in which an encoding process is performed and a data unit in which a retransmission process is performed are different from each other, the encoding process making it possible to determine whether or not decoding is successful; and performing a reception process including decoding the data frame.

REFERENCE SIGNS LIST

100 STA
200 AP
110, 210 Wireless communication unit
111, 211 Antenna controller
112, 212 Reception process section
113, 213 MPDU processor
114, 214 Reception buffer
115, 215 Transmission process section
116, 216 MPDU processor
117, 217 Transmission buffer
120, 220 Wireless interface
130, 230 Controller
140, 240 Wired interface
150, 250 Input unit
160, 260 Output unit

The invention claimed is:

1. A wireless LAN communication device comprising:

a generator that generates a first data frame for which a first data unit in which an encoding process of first data is performed and a second data frame for which a second data unit in which a retransmission process of the first data is performed, wherein the first data unit and the second data unit are different from each other, the encoding process making it possible to encode the first data of the first data unit in a manner that enables a receiving device to determine whether or not decoding of the first data of the first data unit is successful; and a transmitter that transmits the first data frame and the second data frame, wherein the first data frame and the second data frame are configured such that, when the receiving device determines that a portion of the first data of the first data unit was not decoded successfully, a portion of the first data of the first data unit that was decoded successfully is combined with a portion of the first data from the second data unit, the portion of the first data from the second data unit corresponding to the portion of the first data of the first data unit that was not decoded successfully.

2. The wireless LAN communication device according to claim 1, wherein the first data unit in which the encoding process is performed is smaller than the second data unit in which the retransmission process is performed.

3. The wireless LAN communication device according to claim 1, wherein the first data unit in which the encoding process is performed is larger than the second data unit in which the retransmission process is performed.

4. The wireless LAN communication device according to claim 1, wherein the generator generates the first data frame and the second data frame through aggregation of data units.

5. The wireless LAN communication device according to claim 4, wherein the generator performs the aggregation until a predetermined data length is reached.

6. The wireless LAN communication device according to claim 5, wherein the first data frame and the second data frame comprise A-MPDU obtained by aggregating MPDUs or A-MSDU obtained by aggregating MSDUs.

7. The wireless LAN communication device according to claim 5, wherein the generator includes a plurality of identical pieces of data for retransmission in the first data frame.

8. The wireless LAN communication device according to claim 1, wherein the generator appends, to the first data frame, information for use in identification of data to be subjected to the retransmission process.

9. The wireless LAN communication device according to claim 8, wherein the information for use in identification of the data includes data length information and sequence number information of the data to be subjected to the retransmission process.

10. The wireless LAN communication device according to claim 8, wherein the generator includes the information for use in identification of the data in a physical layer header or a physical layer trailer appended to the first data frame.

11. A wireless LAN communication method that is executed by a computer, the wireless LAN communication method comprising:
generating a first data frame for which a first data unit in which an encoding process of first data is performed and a second data frame for which a second data unit in which a retransmission process of the first data is performed, wherein the first data unit and the second data unit are different from each other, the encoding process making it possible to encode the first data of the first data unit in a manner that enables a receiving device to determine whether or not decoding of the first data of the first data unit is successful; and
transmitting the first data frame and the second data frame,
wherein the first data frame and the second data frame are configured such that, when the receiving device determines that a portion of the first data of the first data unit was not decoded successfully, a portion of the first data of the first data unit that was decoded successfully is combined with a portion of the first data from the second data unit, the portion of the first data from the second data unit corresponding to the portion of the first data of the first data unit that was not decoded successfully.

12. A wireless LAN communication device comprising circuitry configured to:
receive a first data frame for which a first data unit in which an encoding process of first data is performed and a second data frame for which a second data unit in which a retransmission process of the first data is performed, wherein the first data unit and the second data unit are different from each other, the encoding process making it possible to encode the first data of the first data unit in a manner that enables a receiving device to determine whether or not decoding of the first data of the first data unit is successful;
decode the first data frame and the second data frame; and
when determining that a portion of the first data of the first data unit was not decoded successfully, combine a portion of the first data of the first data unit that was decoded successfully with a portion of the first data from the second data unit, the portion of the first data from the second data unit corresponding to the portion of the first data of the first data unit that was not decoded successfully.

13. The wireless LAN communication device according to claim 12, wherein the circuitry is further configured to specify a range in data for which the decoding of the first data in the first data unit has been unsuccessful, and perform a combining process with a portion of the first data in the second data unit.

14. The wireless LAN communication device according to claim 12, wherein the first data frame and the second data frame are generated through aggregation of data.

15. The wireless LAN communication device according to claim 14, wherein the first data frame and the second data frame comprise A-MPDU obtained by aggregating MPDUs or A-MSDU obtained by aggregating MSDUs.

16. The wireless LAN communication device according to claim 14, wherein the circuitry is further configured to use a plurality of identical pieces of data for retransmission included in the first data frame.

17. The wireless LAN communication device according to claim 12, wherein the circuitry is further configured to identify information for use in identification of data to be subjected to the retransmission process, that has been appended to the first data frame.

18. The wireless LAN communication device according to claim 17, wherein the information for use in identification of the data includes data length information and sequence number information of the data to be subjected to the retransmission process.

19. The wireless LAN communication device according to claim 17, wherein the information for use in identification of the data is included in a physical layer header or a physical layer trailer appended to the first data frame.

20. A wireless LAN communication method that is executed by a computer, the wireless LAN communication method comprising:
receiving a first data frame for which a first data unit in which an encoding process of first data is performed and a second data frame for which a second data unit in which a retransmission process of the first data is performed, wherein the first data unit and the second data unit are different from each other, the encoding process making it possible to encode the first data of the first data unit in a manner that enables a receiving device to determine whether or not decoding of the first data of the first data unit is successful; and
decoding the first data frame and the second data frame; and
when determining that a portion of the first data of the first data unit was not decoded successfully, combining a portion of the first data of the first data unit that was decoded successfully with a portion of the first data from the second data unit, the portion of the first data from the second data unit corresponding to the portion of the first data of the first data unit that was not decoded successfully.

* * * * *